United States Patent
Clark

(10) Patent No.: US 9,420,157 B2
(45) Date of Patent: *Aug. 16, 2016

(54) ZERO DELAY PHOTOGRAPHIC SYNCHRONIZATION SYSTEM AND METHOD

(71) Applicant: Lab Partners Associates, Inc., South Burlington, VT (US)

(72) Inventor: James E. Clark, South Burlington, VT (US)

(73) Assignee: LAB PARTNERS ASSOCIATES, INC., South Burlington, VT (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/456,691

(22) Filed: Aug. 11, 2014

(65) Prior Publication Data

US 2014/0347508 A1 Nov. 27, 2014

Related U.S. Application Data

(63) Continuation of application No. 13/016,345, filed on Jan. 28, 2011, now Pat. No. 8,803,989, which is a continuation of application No. 11/490,322, filed on Jul. 20, 2006, now Pat. No. 7,880,761.

(60) Provisional application No. 60/701,451, filed on Jul. 20, 2005.

(51) Int. Cl.
 *H04N 5/232* (2006.01)
 *H04N 5/225* (2006.01)
 *H04N 5/235* (2006.01)

(52) U.S. Cl.
 CPC ......... *H04N 5/23206* (2013.01); *H04N 5/2251* (2013.01); *H04N 5/2256* (2013.01); *H04N 5/232* (2013.01); *H04N 5/2353* (2013.01); *H04N 5/23203* (2013.01)

(58) Field of Classification Search
 CPC .......... H04N 5/23203; H04N 5/23206; H04N 5/2353; H04N 5/2256; H04N 5/232; H04N 5/2251

See application file for complete search history.

(56) References Cited

U.S. PATENT DOCUMENTS 3,039,375 A   6/1962   Umbach
3,185,056 A   5/1965   Gold et al.

(Continued)

FOREIGN PATENT DOCUMENTS

CA   2616030   1/2013
CA   2648798   9/2013

(Continued)

OTHER PUBLICATIONS

U.S. Appl. No. 14/474,320, Sep. 22, 2015, Notice of Allowance.

(Continued)

*Primary Examiner* — Mekonnen Dagnew
(74) *Attorney, Agent, or Firm* — Birch Tree IP Law & Strategy PLLC

(57) ABSTRACT

A method of synchronizing a remote device to image acquisition by a camera body including detecting a predictor signal of the camera body that occurs a known time prior to shutter opening. The detected predictor signal is used to determine a time to synchronize the remote device to image acquisition via wireless communication. For example, the detected predictor signal may be used to predict when the shutter of the camera will be open. A wireless communication system for synchronizing a remote device to a camera body may include a memory having information used to synchronize the remote device to image acquisition based on the detection of the predictor signal occurring prior to a shutter opening.

20 Claims, 22 Drawing Sheets

(56) References Cited

U.S. PATENT DOCUMENTS

| | | |
|---|---|---|
| 3,205,803 A | 9/1965 | Burgarella et al. |
| 3,259,042 A | 7/1966 | Kagan |
| RE26,627 E | 7/1969 | Burgarella et al. |
| 3,659,509 A | 5/1972 | Burgarella |
| 3,728,947 A | 4/1973 | Harnden et al. |
| 3,782,258 A | 1/1974 | Boekkooi et al. |
| 3,810,214 A | 5/1974 | Malone et al. |
| 4,047,191 A | 9/1977 | Coppa et al. |
| 4,194,818 A | 3/1980 | Matteson et al. |
| 4,201,434 A | 5/1980 | Tureck |
| 4,209,244 A | 6/1980 | Sahara et al. |
| 4,333,719 A | 6/1982 | Takami et al. |
| 4,344,680 A | 8/1982 | Ishida et al. |
| 4,351,594 A | 9/1982 | Ishida et al. |
| 4,355,309 A | 10/1982 | Hughey et al. |
| 4,368,966 A | 1/1983 | Hagyuda |
| 4,482,895 A | 11/1984 | Weinberg |
| 4,509,845 A | 4/1985 | Mizokami |
| 4,571,049 A | 2/1986 | Tsunefuji et al. |
| 4,573,786 A | 3/1986 | Taniguchi et al. |
| 4,603,954 A | 8/1986 | Egawa et al. |
| 4,636,052 A | 1/1987 | Bowsher |
| 4,643,551 A | 2/1987 | Ohmori |
| 4,693,582 A | 9/1987 | Kawamura et al. |
| 4,712,902 A | 12/1987 | Hosomizu et al. |
| 4,740,804 A | 4/1988 | Shands |
| 4,816,850 A | 3/1989 | Phillipeaux et al. |
| 4,816,855 A | 3/1989 | Kitaura et al. |
| 4,884,094 A | 11/1989 | Kitaura et al. |
| 4,988,584 A | 1/1991 | Shaper |
| 5,016,037 A | 5/1991 | Taniguchi et al. |
| 5,159,375 A | 10/1992 | Taniguchi et al. |
| 5,283,610 A | 2/1994 | Sasaki |
| 5,299,012 A | 3/1994 | Tsuruta et al. |
| 5,359,375 A | 10/1994 | Clark |
| 5,384,611 A | 1/1995 | Tsuji et al. |
| 5,422,543 A | 6/1995 | Weinberg |
| 5,436,531 A | 7/1995 | Weinberg |
| 5,521,708 A | 5/1996 | Beretta |
| 5,640,623 A | 6/1997 | Sasaki |
| 5,692,223 A | 11/1997 | Ichikawa et al. |
| 5,708,833 A | 1/1998 | Kinney et al. |
| 5,713,050 A | 1/1998 | Ozawa |
| 5,721,971 A | 2/1998 | Sasaki |
| 5,734,934 A | 3/1998 | Horinishi et al. |
| 5,754,898 A | 5/1998 | Nakano |
| 5,848,306 A | 12/1998 | Shono |
| 6,006,039 A | 12/1999 | Steinberg et al. |
| 6,029,013 A | 2/2000 | Larkin et al. |
| 6,052,539 A | 4/2000 | Latorre |
| 6,088,542 A | 7/2000 | Yanai et al. |
| 6,127,940 A | 10/2000 | Weinberg |
| 6,167,199 A | 12/2000 | Fukui |
| 6,188,431 B1 | 2/2001 | Oie |
| 6,278,481 B1 | 8/2001 | Schmidt |
| 6,351,610 B1 | 2/2002 | Numako et al. |
| 6,353,711 B1 | 3/2002 | Numako et al. |
| 6,366,737 B1 | 4/2002 | Numako et al. |
| 6,400,907 B1 | 6/2002 | Izukawa |
| 6,404,987 B1 | 6/2002 | Fukui |
| 6,430,369 B2 | 8/2002 | Lee et al. |
| 6,453,154 B1 | 9/2002 | Haber et al. |
| 6,524,237 B1 | 2/2003 | McGowan |
| 6,618,557 B1 | 9/2003 | Ziemkowski |
| 6,625,399 B1 | 9/2003 | Davis |
| 6,683,654 B1 | 1/2004 | Haijima |
| 6,718,135 B2 | 4/2004 | Kawasaki et al. |
| 6,731,952 B2 | 5/2004 | Schaeffer et al. |
| 6,748,165 B2 | 6/2004 | Ogasawara |
| 6,778,764 B2 | 8/2004 | Barghini et al. |
| 6,798,986 B2 | 9/2004 | Hagiuda |
| 6,863,417 B2 | 3/2005 | Hill |
| 6,941,067 B2 | 9/2005 | Muramatsu |
| 7,016,603 B2 | 3/2006 | Clark |
| 7,035,534 B2 | 4/2006 | Shih et al. |
| 7,133,607 B2 | 11/2006 | Clark |
| 7,136,709 B2 | 11/2006 | Arling et al. |
| 7,184,658 B2 | 2/2007 | Squillace |
| 7,362,965 B2 | 4/2008 | Clark |
| 7,437,063 B2 | 10/2008 | Clark |
| 7,446,800 B2 | 11/2008 | Holmes |
| 7,463,304 B2 | 12/2008 | Murray |
| 7,702,228 B2 | 4/2010 | Clark |
| 7,714,908 B2 | 5/2010 | Holmes |
| 7,764,875 B2 | 7/2010 | Clark |
| 7,775,575 B2 | 8/2010 | Clark |
| 7,783,188 B2 | 8/2010 | Clark |
| 7,880,761 B2 | 2/2011 | Clark |
| 7,885,533 B2 | 2/2011 | Clark |
| 7,970,267 B1 | 6/2011 | Clark |
| 8,121,468 B2 | 2/2012 | Clark |
| 8,130,276 B2 | 3/2012 | Holmes |
| 8,180,210 B2 | 5/2012 | Clark |
| 8,326,136 B1 | 12/2012 | Clark |
| 8,326,140 B2 | 12/2012 | Clark |
| 8,326,141 B2 | 12/2012 | Clark |
| 8,331,776 B2 | 12/2012 | Clark |
| 8,351,774 B2 | 1/2013 | Clark |
| 8,526,808 B2 | 9/2013 | Clark |
| 8,532,476 B2 | 9/2013 | Clark |
| 8,538,250 B2 | 9/2013 | Clark |
| 8,559,804 B1 | 10/2013 | Clark |
| 8,571,401 B2 | 10/2013 | Clark |
| 8,571,406 B2 | 10/2013 | Clark |
| 8,600,224 B2 | 12/2013 | Clark |
| 8,614,766 B1 | 12/2013 | Clark |
| 8,705,950 B2 | 4/2014 | Clark |
| 8,718,461 B2 | 5/2014 | Clark |
| 8,803,989 B2 | 8/2014 | Clark |
| 8,824,882 B2 | 9/2014 | Clark |
| 8,917,350 B2 | 12/2014 | Clark |
| 2001/0042149 A1 | 11/2001 | Ito et al. |
| 2002/0009296 A1 | 1/2002 | Shaper et al. |
| 2002/0013161 A1 | 1/2002 | Schaeffer et al. |
| 2002/0061192 A1 | 5/2002 | Kawasaki et al. |
| 2002/0067425 A1 | 6/2002 | Iverson |
| 2002/0067923 A1 | 6/2002 | Fujimura |
| 2002/0127019 A1 | 9/2002 | Ogasawara |
| 2002/0191389 A1 | 12/2002 | Hill |
| 2003/0128272 A1 | 7/2003 | Clough et al. |
| 2003/0133018 A1 | 7/2003 | Ziemkowski |
| 2003/0161621 A1 | 8/2003 | Takaiwa |
| 2003/0165335 A1 | 9/2003 | Hagiuda |
| 2003/0193588 A1 | 10/2003 | Yuen et al. |
| 2004/0036774 A1 | 2/2004 | Nichols et al. |
| 2004/0066455 A1 | 4/2004 | Holmes |
| 2004/0101295 A1 | 5/2004 | Clark |
| 2004/0136702 A1 | 7/2004 | Barghini et al. |
| 2004/0145114 A1 | 7/2004 | Ippolito et al. |
| 2004/0234259 A1 | 11/2004 | Muramatsu |
| 2005/0006484 A1 | 1/2005 | Ito |
| 2005/0096753 A1 | 5/2005 | Arling et al. |
| 2005/0174434 A1 | 8/2005 | Chang et al. |
| 2005/0249486 A1 | 11/2005 | Murray |
| 2005/0281549 A1 | 12/2005 | Shih et al. |
| 2006/0014563 A1 | 1/2006 | Cheng |
| 2006/0093341 A1 | 5/2006 | Clark |
| 2006/0093348 A1 | 5/2006 | Squillace |
| 2006/0216009 A1 | 9/2006 | Kawamura |
| 2006/0275024 A1 | 12/2006 | McNary |
| 2006/0291016 A1 | 12/2006 | Ishigami et al. |
| 2007/0058959 A1 | 3/2007 | Clark |
| 2007/0070206 A1 | 3/2007 | Clark |
| 2007/0229250 A1 | 10/2007 | Recker et al. |
| 2007/0237510 A1 | 10/2007 | Clark |
| 2007/0273774 A1 | 11/2007 | Holmes |
| 2008/0193114 A1 | 8/2008 | Clark |
| 2008/0298792 A1 | 12/2008 | Clark |
| 2008/0298793 A1 | 12/2008 | Clark |
| 2009/0034952 A1 | 2/2009 | Clark |
| 2009/0066810 A1 | 3/2009 | Holmes |
| 2009/0185797 A1* | 7/2009 | Ogasawara ............ G03B 15/05 396/59 |
| 2010/0177212 A1 | 7/2010 | Holmes |

(56) References Cited

U.S. PATENT DOCUMENTS

| | | | |
|---|---|---|---|
| 2010/0290771 A1 | 11/2010 | Clark | |
| 2010/0316364 A1 | 12/2010 | Clark | |
| 2011/0123185 A1 | 5/2011 | Clark | |
| 2011/0128390 A1 | 6/2011 | Clark | |
| 2011/0268432 A1 | 11/2011 | Clark | |
| 2012/0027395 A1 | 2/2012 | Clark | |
| 2012/0099847 A1 | 4/2012 | Clark | |
| 2012/0127340 A1 | 5/2012 | Holmes | |
| 2012/0127361 A1 | 5/2012 | Clark | |
| 2012/0140088 A1 | 6/2012 | Clark | |
| 2012/0148221 A1 | 6/2012 | Clark | |
| 2012/0181948 A1 | 7/2012 | Clark | |
| 2012/0194699 A1 | 8/2012 | Kouno | |
| 2012/0207459 A1 | 8/2012 | Clark | |
| 2012/0207460 A1 | 8/2012 | Clark | |
| 2012/0230663 A1* | 9/2012 | Ogasawara | G03B 7/16 396/56 |
| 2012/0243859 A1 | 9/2012 | Clark | |
| 2013/0089313 A1 | 4/2013 | Clark | |
| 2013/0094845 A1 | 4/2013 | Clark | |
| 2013/0100340 A1 | 4/2013 | Clark | |
| 2013/0121674 A1 | 5/2013 | Clark | |
| 2013/0343742 A1 | 12/2013 | Clark | |
| 2014/0241710 A1 | 8/2014 | Clark | |
| 2014/0347508 A1 | 11/2014 | Clark | |
| 2014/0369673 A1 | 12/2014 | Clark | |
| 2015/0124427 A1 | 5/2015 | Clark | |

FOREIGN PATENT DOCUMENTS

| | | |
|---|---|---|
| CN | 2007-80020420.4 | 6/2010 |
| CN | 2010-10600736.4 | 2/2012 |
| CN | 2010-10600736.4 | 12/2012 |
| EP | 0984320 A1 | 3/2000 |
| EP | 07760263.9 | 1/2011 |
| EP | 07760263.9 | 7/2011 |
| EP | 8756458.9 | 7/2011 |
| EP | 11177995.5 | 12/2011 |
| EP | 11177995.5 | 7/2012 |
| EP | 10741797 | 8/2012 |
| EP | 11177995.5 | 8/2012 |
| EP | 11177997.1 | 12/2012 |
| JP | 56-143422 | 11/1981 |
| JP | 59-064821 A | 4/1984 |
| JP | 59-170822 | 9/1984 |
| JP | 63-018874 | 1/1988 |
| JP | 05-093948 | 4/1993 |
| JP | 07-159866 | 6/1995 |
| JP | 2002-244193 A | 8/2002 |
| JP | 2002-318413 | 10/2002 |
| JP | 2003-172970 A | 6/2003 |
| JP | 2003-215672 A | 7/2003 |
| JP | 2003-325451 | 11/2003 |
| JP | 2004-072230 | 3/2004 |
| JP | 2006-149935 | 6/2006 |
| JP | 2007-067870 A | 3/2007 |
| JP | 2010-510491 | 8/2012 |
| KR | 10-0728117 | 6/2007 |
| WO | 9638925 A1 | 12/1996 |
| WO | PCT/US2003/037271 | 5/2004 |
| WO | PCT/US2007/066162 | 11/2007 |
| WO | PCT/US2006/028229 | 2/2008 |
| WO | PCT/US2008/065137 | 9/2008 |
| WO | PCT/US2008/065139 | 9/2008 |
| WO | PCT/US2010/024088 | 7/2010 |
| WO | PCT/US2010/024108 | 9/2010 |
| WO | PCT/US2010/024195 | 9/2010 |
| WO | PCT/US2011/044008 | 11/2011 |
| WO | PCT/US2012/025915 | 6/2012 |

OTHER PUBLICATIONS

U.S. Appl. No. 14/270,107, Sep. 2, 2015, Request for Continued Examination.
Affadavit of James E. Clark: FlashWizard II Synchronizer, signed Mar. 20, 2008; previously submitted in U.S. Appl. No. 11/697,241.
Analog Devices Technical Data Sheet for ADF7020-1 Transceiver IC, Analog Devices, Inc., 2005, pp. 1-44.
ASH Transceiver Impedance Matching; Document Created on Dec. 10, 2001; pp. 1 to 10; http://www.rfm.com/products/apnotes/antennamatch.pdf; last viewed on Dec. 15, 2005.
Canon EOS 40D Usuer's Manual; about Sep. 2007; Canon Corporation.
Canon 600EX and 600EX-RT Speedlite Instruction Manual; Canon Corporation; Copyright 2012 (product launch at least as early as Mar. 2012).
Canon ST-E3-RT Speedlite Transmitter Instruction Manual; Canon Corporation; Copyright 2012 (product launch at least as early as Mar. 2012).
Declaration of James E. Clark filed on Feb. 18, 2005 in U.S. Appl. No. 10/306,759.
Ken Rockwell: Nikon SU-800 Remote Commander; Nov. 1, 2005, http://www.kenrockwell.com/nikon/su800.htm; last viewed on Jul. 18, 2012.
Ken Rockwell; How to Use Nikon Strobes Wirelessly, for Free!; Dec. 17, 2005; http://web.archive.org/web/20051217091704/http://www.kenrockwell.com/nikon/ittlslave.htm; last viewed at Internet archive on Apr. 1, 2010.
Nikon D2x; Sep. 2004; pp. 1 to 12; Nikon Corporation.
Nikon WT-1 Transmitter User's Manual; around Dec. 2003; Nikon Corporation.
Phil Askey, Nikon D2H Review: 15. Wireless: Digital Photography Review, Wireless (Review of WT-1 Transmitter); Dec. 2003; http://www.dpreview.com/reviews/NikonD2H/page15.asp; last viewed on Mar. 18, 2008.
Phil Askey, Nikon D2H Review: 1. Introduction: Digital Photography Review, Nikon D2H Review, Dec. 2003; http://www.dpreview.com/reviews/NikonD2H/; last viewed on Mar. 18, 2008.
Phil Askey, Nikon D2Hs Preview: 1. Introduction: Digital Photography Review (includes Review of WT-2 Transmitter); Feb. 2005; http://www.dpreview.com/articles/nikond2hs/; last viewed Mar. 14, 2008.
PocketWizard MultiMAX Transceiver New Trigger Control Software Features, by LPA Design, Feb. 10, 2001; pp. 1 to 6, United States.
PocketWizard MultiMAX Transceiver Owner's Manual, by LPA Design, May 2001, pp. 1-55 and "Relay Mode" on p. 40, United States.
Quantum FreeWire Transceiver; Jul. 17, 2005; pp. 1 to 7; http://web.archive.org/web/20050717015832/http://www.qtm.com/wireless/freewire.html; last viewed at Internet Archive on Apr. 25, 2008.
Quantum FreeWire Transceiver; Nov. 15, 2004; pp. 1 to 7; http://web.archive.org/web/20041115093657/http://www.qtm.com/wireless/freewire.html; last viewed at Internet Archive on Apr. 25, 2008.
Quantum FreeWire Transceiver; Oct. 7, 2001; pp. 1 to 6; http://web.archive.org/web/20011007140624/http://www.qtm.com/wireless/freewire.html; last viewed at Internet Archive on Apr. 25, 2008.
Rob Galbraith; Casting Light on the PocketWizard MiniTT1 and FlexTT5; Parts 1 to 5; Feb. 16, 2009; http://www.robgalbraith.com/bins/multi_page.asp?cid=7-9884-9903; last viewed on Jul. 12, 2012.
Robert Hanashiro; Equipment Corner—News & Notes for all Those Gear-Heads; Nov. 26, 2001; pp. 1 to 3; http://www.sportsshooter.com/news_story.html?id=594; last viewed on Sep. 17, 2002.
XE-200 RF Shutter Release for Rebel 2000; http://zenopuseelectronix.com/XE-200.html; last viewed on Sep. 9, 2002.
Profoto Pro-B2 User's Manual, dated Jan. 2005.
U.S. Appl. No. 10/306,759, Aug. 29, 2003, Office Action, U.S. Pat. No. 7,016,603.
U.S. Appl. No. 10/306,759, Dec. 18, 2003, Response to Office Action, U.S. Pat. No. 7,016,603.
U.S. Appl. No. 10/306,759, Dec. 24, 2003, Examiner Interview Summary, U.S. Pat. No. 7,016,603.
U.S. Appl. No.10/306,759, Mar. 27, 2004, Final Office Action, U.S. Pat. No. 7,016,603.
U.S. Appl. No. 10/306,759, Apr. 15, 2004, Examiner Interview Summary, U.S. Pat. No. 7,016,603.

(56) References Cited

OTHER PUBLICATIONS

U.S. Appl. No. 10/306,759, Apr. 20, 2004, Response to Final Office Action, U.S. Pat. No. 7,016,603.
U.S. Appl. No. 10/306,759, Aug. 24, 2004, Office Action, U.S. Pat. No. 7,016,603.
U.S. Appl. No. 10/306,759, Feb. 18, 2005, Request for Continued Examination, U.S. Pat. No. 7,016,603.
U.S. Appl. No. 10/306,759, Mar. 29, 2005, Office Action, U.S. Pat. No. 7,016,603.
U.S. Appl. No. 10/306,759, Apr. 14, 2005, Response to Office Action, U.S. Pat. No. 7,016,603.
U.S. Appl. No. 10/306,759, Jun. 29, 2005, Final Office Action, U.S. Pat. No. 7,016,603.
U.S. Appl. No. 10/306,759, Aug. 25, 2005, Response to Final Office Action, U.S. Pat. No. 7,016,603.
U.S. Appl. No. 10/306,759, Sep. 16, 2005, Notice of Allowance, U.S. Pat. No. 7,016,603.
U.S. Appl. No. 10/306,759, Oct. 18, 2005, 312 Amendment, U.S. Pat. No. 7,016,603.
U.S. Appl. No. 10/306,759, Dec. 20, 2005, Response to 312 Amendment, U.S. Pat. No. 7,016,603.
U.S. Appl. No. 10/306,759, Jan. 4, 2006, Response to 312 Amendment, U.S. Pat. No. 7,016,603.
U.S. Appl. No. 10/306,759, Nov. 18, 2006, Certificate of Correction, U.S. Pat. No. 7,016,603.
U.S. Appl. No. 11/305,668, Mar. 8, 2006, Office Action, U.S. Pat. No. 7,133,607.
U.S. Appl. No. 11/305,668, Jun. 8, 2006, Response to Office Action, U.S. Pat. No. 7,133,607.
U.S. Appl. No. 11/305,668, Jun. 13, 2006, Supplemental Response to Request for Clarification by the Examiner, U.S. Pat. No. 7,133,607.
U.S. Appl. No. 11/305,668, Jun. 30, 2006, Notice of Allowance, U.S. Pat. No. 7,133,607.
U.S. Appl. No. 11/305,668, Mar. 29, 2007, Request for Correction of Letters, U.S. Pat. No. 7,133,607.
U.S. Appl. No. 11/488/491, Oct. 16, 2007, Office Action.
U.S. Appl. No. 11/490,322, Apr. 20, 2010, Office Action, U.S. Pat. No. 7,880,761.
U.S. Appl. No. 11/490,322, Jul. 12, 2010, Response to Office Action, U.S. Pat. No. 7,880,761.
U.S. Appl. No. 11/490,322, Sep. 15, 2010, Notice of Allowance, U.S. Pat. No. 7,880,761.
U.S. Appl. No. 11/529,203, Aug. 14, 2007, Office Action, U.S. Pat. No. 7,362,965.
U.S. Appl. No. 11/529,203, Oct. 16, 2007, Terminal Disclaimer, U.S. Pat. No. 7,362,965.
U.S. Appl. No. 11/529,203, Oct. 16, 2007, Response to Office Action, U.S. Pat. No. 7,362,965.
U.S. Appl. No. 11/529,203, Oct. 25, 2007, Terminal Disclaimer, U.S. Pat. No. 7,362,965.
U.S. Appl. No. 11/529,203, Dec. 14, 2007, Notice of Allowance, U.S. Pat. No. 7,362,965.
U.S. Appl. No. 11/697,241, Nov. 8, 2007, Office Action, U.S. Pat. No. 7,437,063.
U.S. Appl. No. 11/697,241, Mar. 10, 2008, Response to Office Action, U.S. Pat. No. 7,437,063.
U.S. Appl. No. 11/697,241, Mar. 24, 2008, Examiner Interview Summary, U.S. Pat. No. 7,437,063.
U.S. Appl. No. 11/697,241, Jun. 9, 2008, Notice of Allowance, U.S. Pat. No. 7,437,063.
U.S. Appl. No. 12/104,950, Dec. 31, 2009, Office Action, U.S. Pat. No. 7,764,875.
U.S. Appl. No. 12/104,950, Feb. 1, 2010, Response to Office Action, U.S. Pat. No. 7,764,875.
U.S. Appl. No. 12/104,950, Mar. 23, 2010, Notice of Allowance, U.S. Pat. No. 7,764,875.
U.S. Appl. No. 12/129,402, Apr. 19, 2010, Notice of Allowance, U.S. Pat. No. 7,783,188.
U.S. Appl. No. 12/129,447, Apr. 12, 2010, Notice of Allowance, U.S. Pat. No. 7,775,575.
U.S. Appl. No. 12/129,447, Apr. 12, 2010, Examiner Amendment, U.S. Pat. No. 7,775,575.
U.S. Appl. No. 12/250,914, Jun. 12, 2009, Office Action, U.S. Pat. No. 7,702,228.
U.S. Appl. No. 12/250,914, Jun. 29, 2009, Response to Office Action and, U.S. Pat. No. 7,702,228.
U.S. Appl. No. 12/250,914, Oct. 28, 2009, Terminal Disclaimer, U.S. Pat. No. 7,702,228.
U.S. Appl. No. 12/250,914, Dec. 3, 2009, Notice of Allowance, U.S. Pat. No. 7,702,228.
U.S. Appl. No. 12/705,052, Mar. 27, 2012, Office Action, U.S. Pat. No. 8,326,141.
U.S. Appl. No. 12/705,052, Jun. 27, 2012, Response to Office Action, U.S. Pat. No. 8,326,141.
U.S. Appl. No. 12/705,052, Sep. 5, 2012, Notice of Allowance, U.S. Pat. No. 8,326,141.
U.S. Appl. No. 12/705,096, Mar. 12, 2012, Office Action, U.S. Pat. No. 8,326,136.
U.S. Appl. No. 12/705,096, Jun. 12, 2012, Response to Office Action, U.S. Pat. No. 8,326,136.
U.S. Appl. No. 12/705,096, Aug. 8, 2012, Notice of Allowance, U.S. Pat. No. 8,326,136.
U.S. Appl. No. 12/705,164, Mar. 29, 2012, Office Action, U.S. Pat. No. 8,614,766.
U.S. Appl. No. 12/705,164, Jun. 29, 2012, Response to Office Action, U.S. Pat. No. 8,614,766.
U.S. Appl. No. 12/705,164, Sep. 7, 2012, Office Action, U.S. Pat. No. 8,614,766.
U.S. Appl. No. 12/705,164, Nov. 21, 2012, Response to Office Action, U.S. Pat. No. 8,614,766.
U.S. Appl. No. 12/705,164, Nov. 21, 2012, Advisory Action and Applicant Initiated, U.S. Pat. No. 8,614,766.
U.S. Appl. No. 12/705,164, Nov. 29, 2012, RCE, U.S. Pat. No. 8,614,766.
U.S. Appl. No. 12/705,164, Aug. 14, 2013, Notice of Allowance, U.S. Pat. No. 8,614,766.
U.S. Appl. No. 12/762,811, Dec. 28, 2010, Office Action, U.S. Pat. No. 7,970,267.
U.S. Appl. No. 12/762,811, Mar. 28, 2011, Response to Office Action, U.S. Pat. No. 7,970,267.
U.S. Appl. No. 12/762,811, Mar. 28, 2011, Terminal Disclaimer, U.S. Pat. No. 7,970,267.
U.S. Appl. No. 12/762,811, Apr. 20, 2011, Notice of Allowance, U.S. Pat. No. 7,970,267.
U.S. Appl. No. 12/843,254, Jul. 27, 2010, Preliminary Remarks, U.S. Pat. No. 8,121,468.
U.S. Appl. No. 12/843,254, Aug. 25, 2011, Office Action, U.S. Pat. No. 8,121,468.
U.S. Appl. No. 12/843,254, Aug. 25, 2011, Response to Office Action, U.S. Pat. No. 8,121,468.
U.S. Appl. No. 12/843,254, Aug. 25, 2011, Terminal Disclaimer, U.S. Pat. No. 8,121,468.
U.S. Appl. No. 12/843,254, Nov. 28, 2011, Notice of Allowance, U.S. Pat. No. 8,121,468.
U.S. Appl. No. 12/861,445, Sep. 30, 2010, Notice of Allowance, U.S. Pat. No. 7,885,533.
U.S. Appl. No. 13/016,345, Apr. 26, 2013, Restriction Requirement, U.S. Pat. No. 8,803,989.
U.S. Appl. No. 13/016,345, May 28, 2013, Response to Restriction Requirement, U.S. Pat. No. 8,803,989.
U.S. Appl. No. 13/016,345, Sep. 17, 2013, Office Action, U.S. Pat. No. 8,803,989.
U.S. Appl. No. 13/016,345, Mar. 17, 2014, Response to Office Action, U.S. Pat. No. 8,803,989.
U.S. Appl. No. 13/016,345, Apr. 10, 2014, Notice of Allowance, U.S. Pat. No. 8,803,989.
U.S. Appl. No. 13/016,345, Jul. 23, 2014, Issue Notification, U.S. Pat. No. 8,803,989.
U.S. Appl. No. 13/021,951, Nov. 25, 2011, Notice of Allowance, U.S. Pat. No. 8,331,776.
U.S. Appl. No. 13/021,951, Feb. 13, 2012, Withdrawal of Notice of Allowance, U.S. Pat. No. 8,331,776.

(56) References Cited

OTHER PUBLICATIONS

U.S. Appl. No. 13/021,951, Feb. 22, 2012, Office Action, U.S. Pat. No. 8,331,776.
U.S. Appl. No. 13/021,951, Jul. 20, 2012, Response to Office Action, U.S. Pat. No. 8,331,776.
U.S. Appl. No. 13/021,951, Oct. 5, 2012, Notice of Allowance, U.S. Pat. No. 8,331,776.
U.S. Appl. No. 13/169,413, Dec. 20, 2011, Office Action, U.S. Pat. No. 8,180,210.
U.S. Appl. No. 13/169,413, Jan. 16, 2012, Response to Office Action, U.S. Pat. No. 8,180,210.
U.S. Appl. No. 13/169,413, Jan. 16, 2012, Terminal Disclaimers, U.S. Pat. No. 8,180,210.
U.S. Appl. No. 13/169,413, Mar. 22, 2012, Notice of Allowance, U.S. Pat. No. 8,180,210.
U.S. Appl. No. 13/183,046, Feb. 13, 2013, Office Action, U.S. Pat. No. 8,600,224.
U.S. Appl. No. 13/183,046, Apr. 29, 2013, Response to Office Action, U.S. Pat. No. 8,600,224.
U.S. Appl. No. 13/183,046, Jul. 31, 2013, Notice of Allowance, U.S. Pat. No. 8,600,224.
U.S. Appl. No. 13/201,182, May 24, 2013, Restriction Requirement.
U.S. Appl. No. 13/201,182, Aug. 26, 2013, Response to Restriction Requirement.
U.S. Appl. No. 13/201,182, Nov. 18, 2013, Office Action.
U.S. Appl. No. 13/201,185, Nov. 22, 2013, Office Action/Restriction Requirement.
U.S. Appl. No. 13/201,281, Sep. 25, 2013, Office Action, U.S. Pat. No. 8,917,350.
U.S. Appl. No. 13/201,281, Mar. 24, 2014, Response to Office Action, U.S. Pat. No. 8,917,350.
U.S. Appl. No. 13/201,281, Mar. 24, 2014, Terminal Disclaimer, U.S. Pat. No. 8,917,350.
U.S. Appl. No. 13/201,281, Apr. 21, 2014, Notice of Allowance, U.S. Pat. No. 8,917,350.
U.S. Appl. No. 13/201,281, Dec. 3, 2014, Issue Notification, U.S. Pat. No. 8,917,350.
U.S. Appl. No. 13/208,686, Feb. 6, 2013, Office Action, U.S. Pat. No. 8,705,950.
U.S. Appl. No. 13/208,686, May 6, 2013, Response to Office Action, U.S. Pat. No. 8,705,950.
U.S. Appl. No. 13/208,686, Jul. 15, 2013, Final Office Action, U.S. Pat. No. 8,705,950.
U.S. Appl. No. 13/208,686, Aug. 16, 2013, Applicant Initiated Interview Summary, U.S. Pat. No. 8,705,950.
U.S. Appl. No. 13/208,686, Sep. 16, 2013, Response to Office Action, U.S. Pat. No. 8,705,950.
U.S. Appl. No. 13/208,686, Sep. 30, 2013, Notice of Allowance, U.S Pat. No. 8,705,950.
U.S. Appl. No. 13/208,706, Dec. 26, 2012, Office Action, U.S. Pat. No. 8,571,406.
U.S. Appl. No. 13/208,706, Mar. 26, 2013, Response to Office Action, U.S. Pat. No. 8,571,406.
U.S. Appl. No. 13/208,706, Jul. 2, 2013, Notice of Allowance, U.S. Pat. No. 8,571,406.
U.S. Appl. No. 13/253,596, Nov. 30, 2011, Office Action, U.S. Pat. No. 8,326,140.
U.S. Appl. No. 13/253,596, Feb. 29, 2012, Response to Office Action, U.S. Pat. No. 8,326,140.
U.S. Appl. No. 13/253,596, Feb. 29, 2012, Terminal Disclaimer, U.S. Pat. No. 8,326,140.
U.S. Appl. No. 13/253,596, May 9, 2012, Final Office Action, U.S. Pat. No. 8,326,140.
U.S. Appl. No. 13/253,596, Jul. 18, 2012, Request for Continued Examination, U.S. Pat. No. 8,326,140.
U.S. Appl. No. 13/253,596, Jul. 18, 2012, Response to Office Action, U.S. Pat. No. 8,326,140.
U.S. Appl. No. 13/253,596, Aug. 9, 2012, Notice of Allowance, U.S. Pat. No. 8,326,140.
U.S. Appl. No. 13/399,333, Jun. 14, 2012, Office Action, U.S. Pat. No. 8,351,774.
U.S. Appl. No. 13/399,333, Sep. 14, 2012, Response to Office Action, U.S. Pat. No. 8,351,774.
U.S. Appl. No. 13/399,333, Sep. 14, 2012, Terminal Disclaimers, U.S. Pat. No. 8,351,774.
U.S. Appl. No. 13/399,333, Sep. 28, 2012, Notice of Allowance, U.S. Pat. No. 8,351,774.
U.S. Appl. No. 13/401,175, May 6, 2013, Office Action, U.S. Pat. No. 8,718,461.
U.S. Appl. No. 13/401,175, Aug. 6, 2013, Response to Office Action, U.S. Pat. No. 8,718,461.
U.S. Appl. No. 13/401,175, Sep. 20, 2013, Notice of Allowance, U.S. Pat. No. 8,718,461.
U.S. Appl. No. 13/401,175, Dec. 16, 2013, Notice to File Corrected Application, U.S. Pat. No. 8,718,461.
U.S. Appl. No. 13/401,175, Jan. 13, 2014, Corrected Notice of Allowability, U.S. Pat. No. 8,718,461.
U.S. Appl. No. 13/401,175, Mar. 20, 2014, Reponse to Notice to File Corrected, U.S. Pat. No. 8,718,461.
U.S. Appl. No. 13/401,175, Mar. 20, 2014, Petition to Revive, U.S. Pat. No. 8,718,461.
U.S. Appl. No. 13/401,175, Apr. 1, 2014, Petition Decision to Revive, U.S. Pat. No. 8,718,461.
U.S. Appl. No. 13/401,175, Apr. 16, 2015, Issue Notification, U.S. Pat. No. 8,718,461.
U.S. Appl. No. 13/438,500, Jun. 18, 2012, Office Action, U.S. Pat. No. 8,559,804.
U.S. Appl. No. 13/438,500, Sep. 14, 2012, Response to Office Action, U.S. Pat. No. 8,559,804.
U.S. Appl. No. 13/438,500, Sep. 14, 2012, Terminal Disclaimers, U.S. Pat. No. 8,559,804.
U.S. Appl. No. 13/438,500, Jun. 12, 2013, Notice of Allowance, U.S. Pat. No. 8,559,804.
U.S. Appl. No. 13/692,515, Jun. 24, 2013, Notice of Allowance, U.S. Pat. No. 8,571,401.
U.S. Appl. No. 13/692,550, May 16, 2013, Notice of Allowance, U.S. Pat. No. 8,538,250.
U.S. Appl. No. 13/692,550, Jul. 2, 2013, Supplemental Notice of Allowance, U.S. Pat. No. 8,538,250.
U.S. Appl. No. 13/708,326, Mar. 26, 2013, Notice of Allowance, U.S. Pat. No. 8,526,808.
U.S. Appl. No. 13/735,325, Mar. 15, 2013, Office Action, U.S. Pat. No. 8,532,476.
U.S. Appl. No. 13/735,325, Mar. 21, 2013, Response to Office Action w/Terminal, U.S. Pat. No. 8,532,476.
U.S. Appl. No. 13/735,325, May 14, 2013, Notice of Allowance, U.S. Pat. No. 8,532,476.
U.S. Appl. No. 14/015,336, Nov. 8, 2013, Office Action, U.S. Pat. No. 8,824,882.
U.S. Appl. No. 14/015,336, Apr. 7, 2014, Response to Office Action, U.S. Pat. No. 8,824,882.
U.S. Appl. No. 14/015,336, Apr. 7, 2014, Terminal Disclaimers, U.S. Pat. No. 8,824,882.
U.S. Appl. No. 14/015,336, May 2, 2014, Notice of Allowance, U.S. Pat. No. 8,824,882.
U.S. Appl. No. 14/021,200, Oct. 8, 2013, Office Action.
U.S. Appl. No. 14/270,107, Jun. 3, 2014, Office Action.
U.S. Appl. No. 14/270,107, Dec. 3, 2014, Response to Office Action.
U.S. Appl. No. 14/270,107, Dec. 3, 2014, Terminal Disclaimer.
U.S. Appl. No. 14/270,107, Mar. 6, 2015, Final Office Action.
U.S. Appl. No. 14/270,107, Jun. 6, 2015, Response to Office Action.
U.S. Appl. No. 14/270,107, Jun. 15, 2015, Notice of Allowance.
U.S. Appl. No. 14/474,320, Apr. 27, 2015, Office Action.
U.S. Appl. No. 14/474,320, Jul. 30, 2015, Response to Office Action.
U.S. Appl. No. 14/474,320, Jul. 30, 2015, Terminal Disclaimers.
U.S. Appl. No. 10/306,759, filed Nov. 26, 2002, U.S. Pat. No. 7,016,603.
U.S. Appl. No. 11/305,668, filed Dec. 16, 2005, U.S. Pat. No. 7,133,607.
U.S. Appl. No. 11/490,322, filed Jul. 20, 2006, U.S. Pat. No. 7,880,761.

(56) References Cited

OTHER PUBLICATIONS

U.S. Appl. No. 11/529,203, filed Sep. 27, 2006, U.S. Pat. No. 7,362,965.
U.S. Appl. No. 11/697,241, filed Apr. 5, 2007, U.S. Pat. No. 7,437,063.
U.S. Appl. No. 12/104,950, filed Apr. 17, 2008, U.S. Pat. No. 7,764,875.
U.S. Appl. No. 12/129,402, filed May 29, 2008, U.S. Pat. No. 7,783,188.
U.S. Appl. No. 12/129,447, filed May 29, 2008, U.S. Pat. No. 7,775,575.
U.S. Appl. No. 12/250,914, filed Oct. 14, 2008, U.S. Pat. No. 7,702,228.
U.S. Appl. No. 12/705,052, filed Feb. 12, 2010, U.S. Pat. No. 8,326,141.
U.S. Appl. No. 12/705,096, filed Feb. 12, 2010, U.S. Pat. No. 8,326,136.
U.S. Appl. No. 12/705,164, filed Feb. 12, 2010, U.S. Pat. No. 8,614,766.
U.S. Appl. No. 12/762,811, filed Apr. 19, 2010, U.S. Pat. No. 7,970,267.
U.S. Appl. No. 12/843,254, filed Jul. 26, 2010, U.S. Pat. No. 8,121,468.
U.S. Appl. No. 12/861,445, filed Aug. 23, 2010, U.S. Pat. No. 7,885,533.
U.S. Appl. No. 13/016,345, filed Jan. 28, 2011, U.S. Pat. No. 8,803,989.
U.S. Appl. No. 13/021,951, filed Feb. 7, 2011, U.S. Pat. No. 8,331,776.
U.S. Appl. No. 13/169,413, filed Jun. 27, 2011, U.S. Pat. No. 8,180,210.
U.S. Appl. No. 13/201,182, Aug. 11, 2011.
U.S. Appl. No. 13/201,185, Aug. 11, 2011.
U.S. Appl. No. 13/401,175, Feb. 21, 2012.
U.S. Appl. No. 14/201,200, Sep. 9, 2013.
U.S. Appl. No. 14/270,107, May 5, 2014.
U.S. Appl. No. 14/472,320, Aug. 28, 2014.
U.S. Appl. No. 14/533,067, Nov. 4, 2014.
U.S. Appl. No. 14/270,107, Oct. 30, 2015, Notice of Allowance.
U.S. Appl. No. 14/987,589, filed Jan. 4, 2016.

* cited by examiner

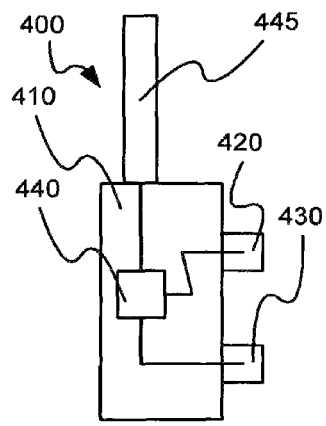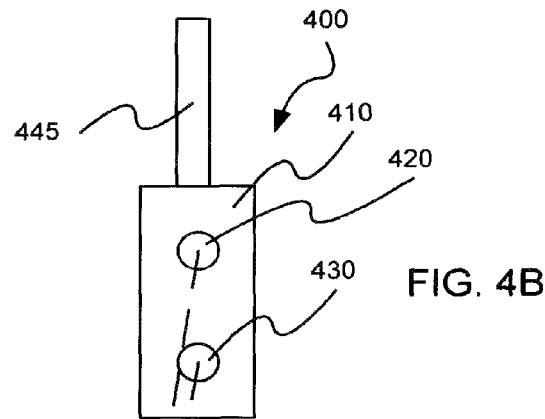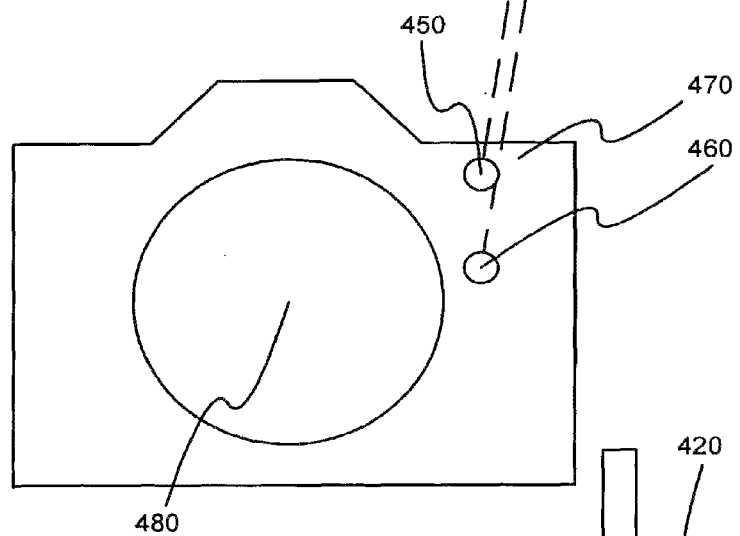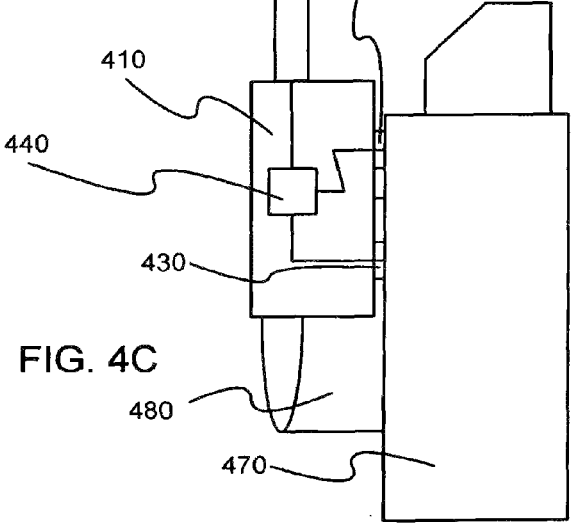

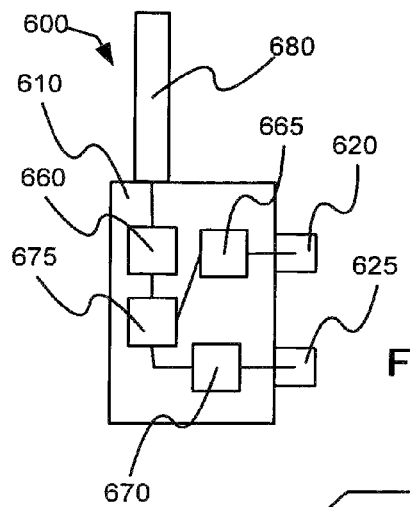
FIG. 6A
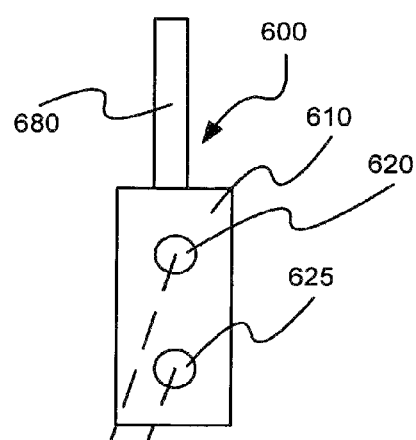
FIG. 6B
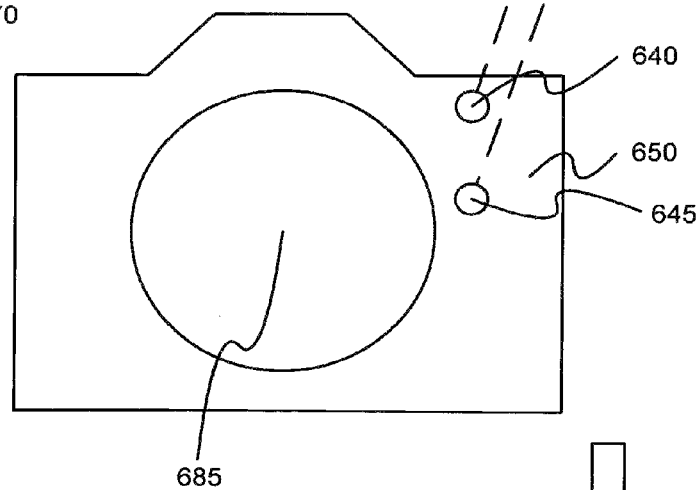
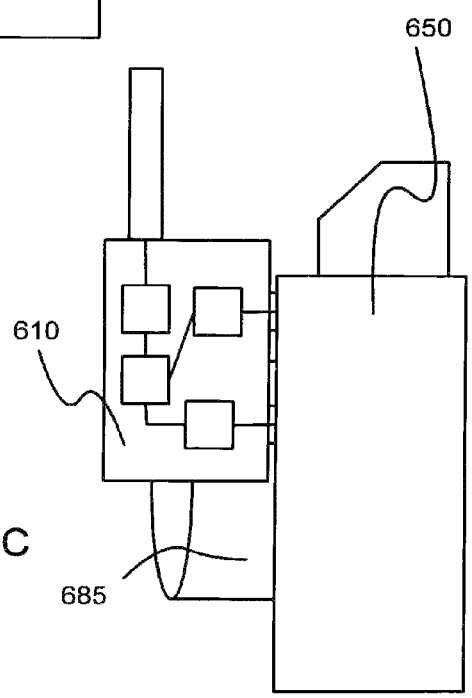
FIG. 6C

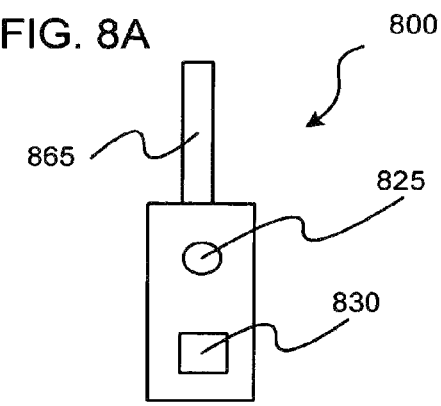
FIG. 8A
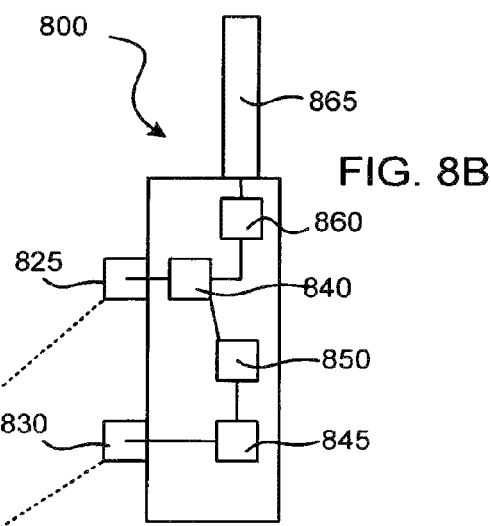
FIG. 8B
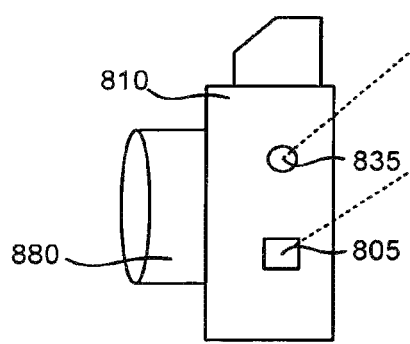
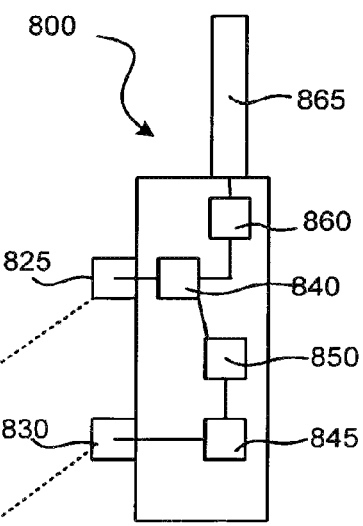
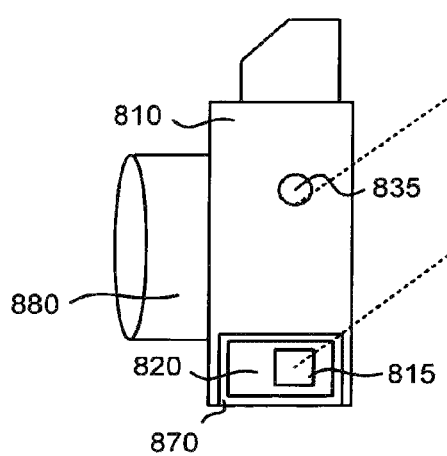
FIG. 8C

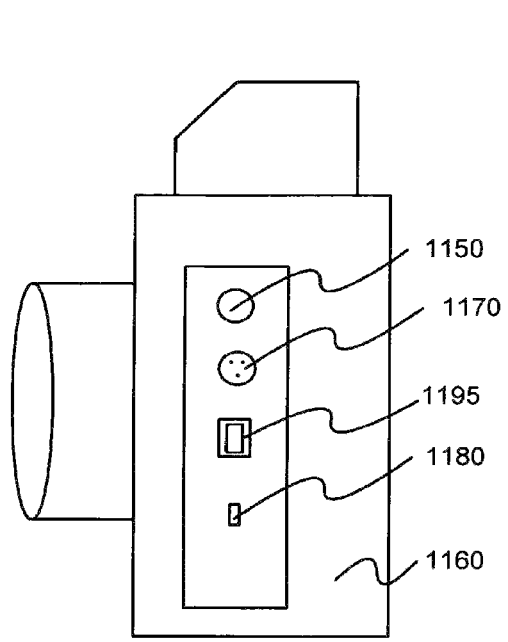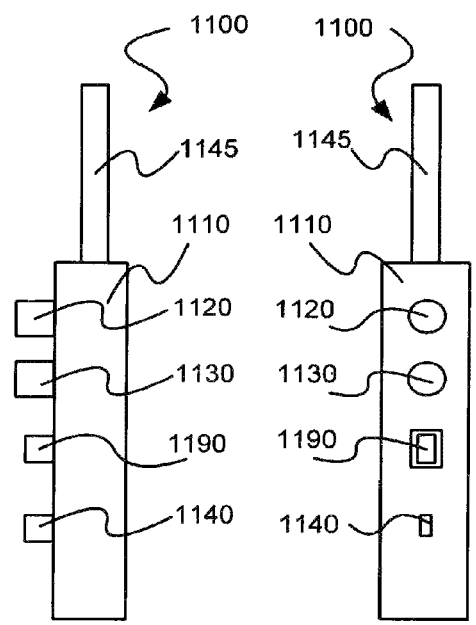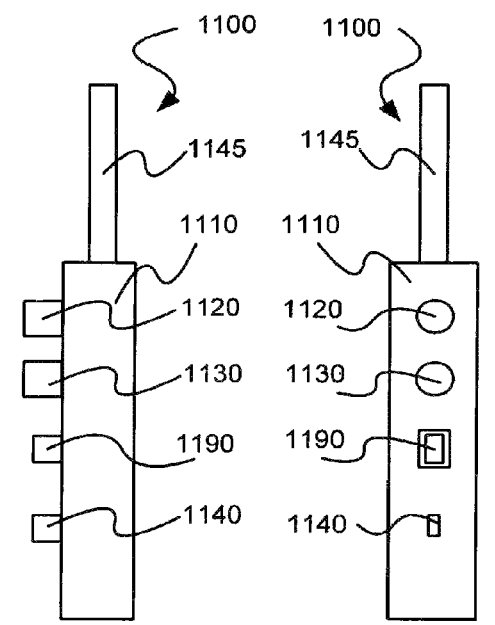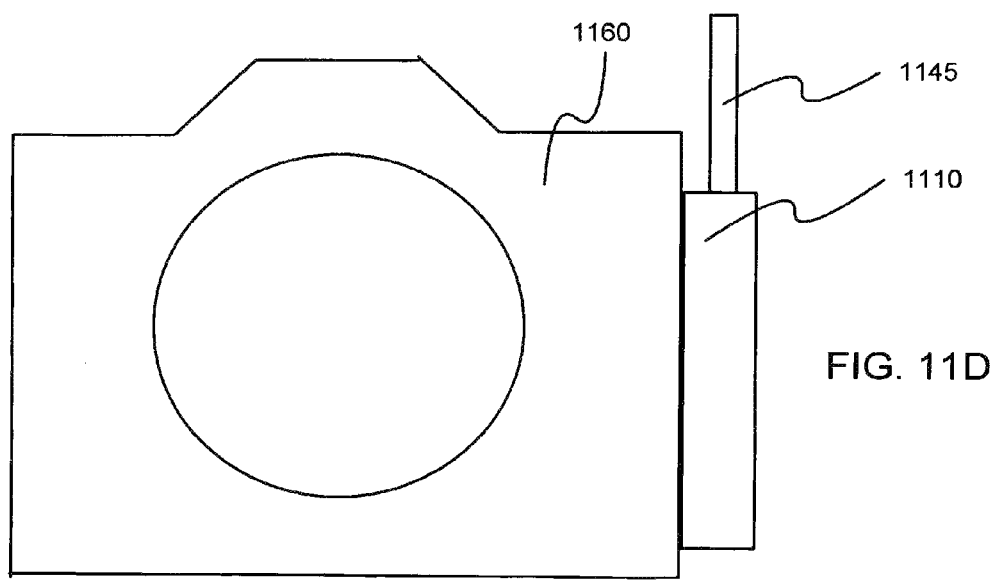

ZERO DELAY PHOTOGRAPHIC SYNCHRONIZATION SYSTEM AND METHOD

RELATED APPLICATION DATA

This application is a continuation application of U.S. patent application Ser. No. 13/016,345, filed Jan. 28, 2011, and titled "Zero Delay Photographic Synchronization System and Method, which is a continuation application of U.S. patent application Ser. No. 11/490,322, filed Jul. 20, 2006, and titled "Wireless Photographic Communication System and Method," each of which is incorporated by reference herein in its entirety. This application also claims the benefit of priority of U.S. Provisional Patent Application Ser. No. 60/701,451, filed Jul. 20, 2005, and titled "Wireless Photographic Communication System and Method", which is incorporated by reference herein in its entirety.

FIELD OF THE INVENTION

The present disclosure generally relates to the field of photography. In particular, the present disclosure is directed to a wireless photographic communication system and method.

BACKGROUND OF THE INVENTION

Previously, a user of a camera body that desired to add wireless communication capabilities to a camera would have to use either an external or internal module to modify the camera so as to provide such capabilities. An internal wireless module may be mounted inside the body of the camera, thus providing wireless capabilities with as little as an antenna visible from on the outside of the camera body. However, an internal wireless communication module may require some disassembly of the camera body itself for installation. Typical external wireless communication devices generally include a transmitter, receiver, and/or a transceiver in a body that requires some form of connectivity to the controls of the camera body to provide the camera body with the wireless communication functionality. Typically, an external wireless communication device remains separate from the camera body and uses wires to connect to a port of a camera. This type of external wireless communication device may require physical attachment to some part of the camera or its surroundings. This may be accomplished by tape, Velcro, or other aesthetically and physically unappealing techniques. Existing external wireless communication devices also have their own power supplies. The power supplies typically add to the size and mass of the module. The wires add to the complication and external bulk of using the external module. Another example of an external wireless communication device may be mounted in the hotshoe of a camera. The hotshoe only provides access to shutter synchronization. The hotshoe is typically reserved for a flash module, thus, when a wireless communication module is inserted therein, the hotshoe is unavailable for a flash or other device. Additionally, the hotshoe does not provide access to a power supply of the camera body. Thus, a hotshoe connected wireless communication module still requires its own power supply. It would be desirable to have a more compact, elegant, and directly connected module for providing wireless communication capability to a camera. It is also desirable to have a wireless communication module that leaves the hotshoe of the camera free to receive other devices, such as a flash.

SUMMARY OF THE INVENTION

In one implementation, a method of synchronizing a remote device to image acquisition by a camera body is provided. The method includes detecting a predictor signal of the camera body, the predictor signal occurring at a known time prior to a shutter of the camera body opening; wirelessly communicating one or more signals to the remote lighting device, at least one of the one or more signals including a time indication based on the time between the predictor signal and the shutter opening; and synchronizing the remote lighting device to image acquisition using the time indication.

In another implementation, a method of synchronizing a remote device to image acquisition by a camera body is provided. The method includes detecting a predictor signal of the camera body, the predictor signal occurring a known time prior to a shutter of the camera body opening; wirelessly communicating one or more signals to the remote lighting device, at least one of the one or more signals including information based on the detected predictor signal; and using stored predictive information of the time between the detected predictor signal and the shutter opening to synchronize the remote lighting device to image acquisition.

In yet another implementation, a wireless communication system for synchronizing a remote device to image acquisition by a camera body is provided. The wireless communication system includes a connection to an external connector of the camera body, the external connector providing access to a predictor signal of the camera body occurring at a known time prior to a shutter opening of the camera body; a wireless communication circuit for wirelessly communicating one or more signals to the remote lighting device, the one or more signals being based on a detected predictor signal from the external connector; a memory element having stored timing information, the stored timing information including predictive information indicating a time between the detected predictor signal and the shutter opening; and a processor for determining a time of synchronization of the remote lighting device from the detected predictor signal and the stored timing information.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4A illustrates a first view of one example of a wireless communication module, FIG. 4B illustrates a second view of the example wireless communication module in proximity to an example camera, FIG. 4C illustrates the example wireless communication module directly connected to the example camera;

FIG. 6A illustrates a first view of another example of a wireless communication module, FIG. 6B illustrates a second view of the example wireless communication module in proximity to an example camera, FIG. 6C illustrates the example wireless communication module directly connected to the example camera;

FIG. 8A illustrates a first view of still another example of a wireless communication module, FIG. 8B illustrates a second view of the example wireless communication module in proximity to a first example camera, FIG. 8C illustrates the example wireless communication module in proximity to a second example camera;

FIG. 11A illustrates a first view of an example camera body, FIG. 11B illustrates a first view of a further example of a wireless communication module, FIG. 11C illustrates a second view of the example wireless communication module, FIB. 11D illustrates the example wireless communication module directly connected to the example camera body;

DETAILED DESCRIPTION

It is often desirable to provide wireless communication capability to a camera. A wireless communication module is provided for enabling a camera to wirelessly communicate with a remote device. In one example, a camera body may communicate wirelessly with a remote device for many purposes, such as controlling the remote device, sending information to the remote device, receiving information from the remote device, being controlled by the remote device, and any combinations thereof. Wireless communication may occur over any of a variety of well known communication techniques. Examples of wireless communication techniques include, but are not limited to, radio frequency (RF), optical, and any combinations thereof. Various aspects of wireless communication techniques, including encoding of wireless signals, are discussed in U.S. Pat. No. 5,359,375 to Clark, issued on Oct. 25, 1994, which is incorporated herein by reference in its entirety. Examples of remote devices include, but are not limited to, a light source, such as a flash or continuous light source; a camera; a light meter, such as a light intensity or light color spectrum meter; a general computing device, such as a personal computer or handheld computing device; and any combinations thereof.

In one embodiment, a wireless communication module includes a transmitter, a receiver, and/or a transceiver for providing wireless communication with a remote device. A wireless communication module also includes one or more pressure connectors directly on the body of the module for connecting the module to one or more ports of a camera body. In one example, the one or more pressure connectors are integral with the shape of the module body. The one or more pressure connectors may be integral with the shape of the module body in many ways including, but not limited to, by molding one or more pressure connectors uniformly with the body itself, by attaching one or more pressure connectors directly to a surface of the module body, and any combinations thereof. In another example, the one or more pressure connectors include a male portion that protrudes directly from a surface of the module body. The male portion is sized and configured for direct insertion into a port of a camera body. In yet another example, the one or more pressure connectors include a female portion designed to mate with a male port element of a camera body. In one aspect, pressure can be applied to the module body to cause the one or more pressure connectors to connect with one or more ports of a camera body. Wires between the wireless communication module and the camera are unnecessary and use of the camera hotshoe is not required. This allows for compact and elegant designs that conform directly to a camera body in a manner not previously available.

Figure 1:
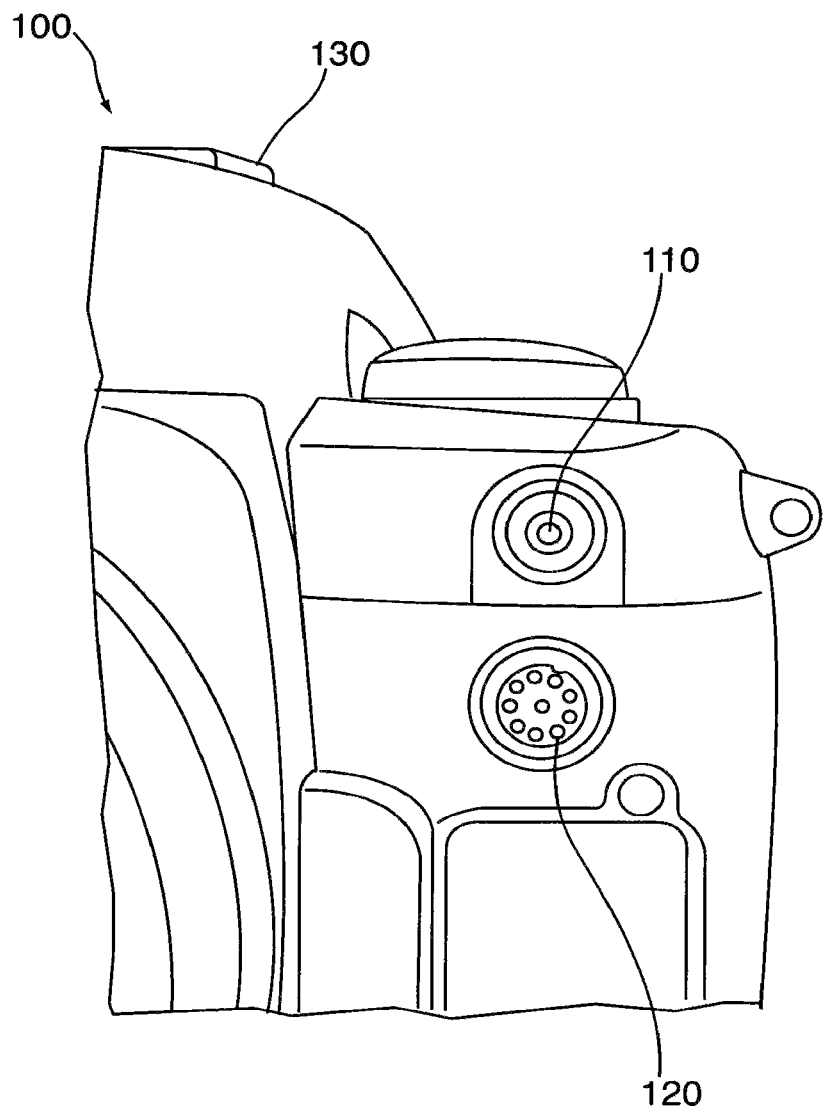
FIG. 1 illustrates exemplary external ports on one example of a camera body.

FIGS. 1, 2, 3A and 3B illustrate examples of camera bodies to which an example wireless communication module may be connected. It should be noted that these example bodies only represent a small percentage of the various camera bodies known to those in the art. FIG. 1 illustrates one example of a camera body 100. Camera body 100 includes two ports that are common to camera bodies: a PC port or connector 110 and a motor-drive port 120 (e.g., a 10-pin female motor-drive port). A PC port, such as PC port or connector 110, is also known in the camera industry as a flash synchronization port and a synch port. As used herein the term "PC" does not refer to a personal computer. PC port 110 and motor-drive port 120 are typically on the front face of camera body 100. Camera 100 also includes a hotshoe 130. Hotshoe 130 is typically used to attach an external flash device to camera 100. Depending on the manufacturer and model of a particular camera body, the external ports of the camera body may provide access to a variety of internal functions and information. Also the size, location, and relation to other external ports may differ on camera bodies. In one example, a PC port, such as PC port 110, may provide access to a shutter synchronization signal indicating the activity of the camera shutter. This synchronization signal is present in cameras that have a physical shutter as in many film and digital cameras and in cameras that have a logical shutter (e.g., as in some point-and-shoot digital cameras). Depending on the camera body, however, access to a shutter synchronization signal may be provided by a different type of external port. In another example, a motor-drive port, such as motor-drive port 120, may provide access to internal functions including, but not limited to, access to direct power that is available even when the camera body is turned off, access to electrical ground, access to switched power, access to serial communication with camera controls (such as RS-232 communication and universal serial bus "USB" communication), access to data input functionality, communication with "half-press" pre-release trigger control, communication with "full-press" release trigger control, and any combinations thereof.

Figure 2:
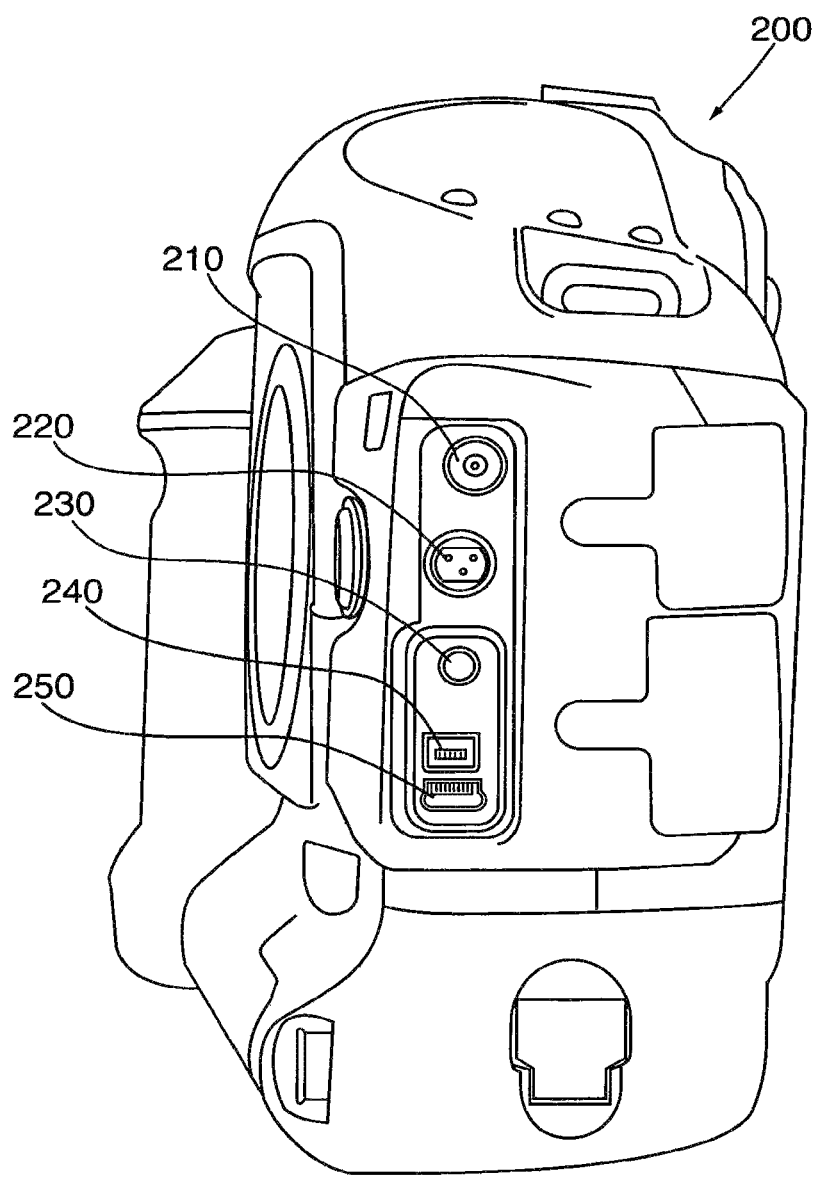
FIG. 2 illustrates exemplary external ports on another example of a camera body.

FIG. 2 illustrates another example of a camera body 200. Camera body 200 includes a PC port 210, a motor-drive port 220 (e.g., a 3-pin female motor-drive port), a video out port 230, a universal serial bus (USB) port 240, and an IEEE 1394 (Firewire) port 250. In this example, motor-drive port 220 may or may not provide access to an internal power supply of camera body 200. Firewire port 250 may provide access to an internal power supply of camera body 200. In one example, firewire port 250 provides access to a power supply having a current of about 2.5 milliamps (mA).

Figures 3A, 3B:
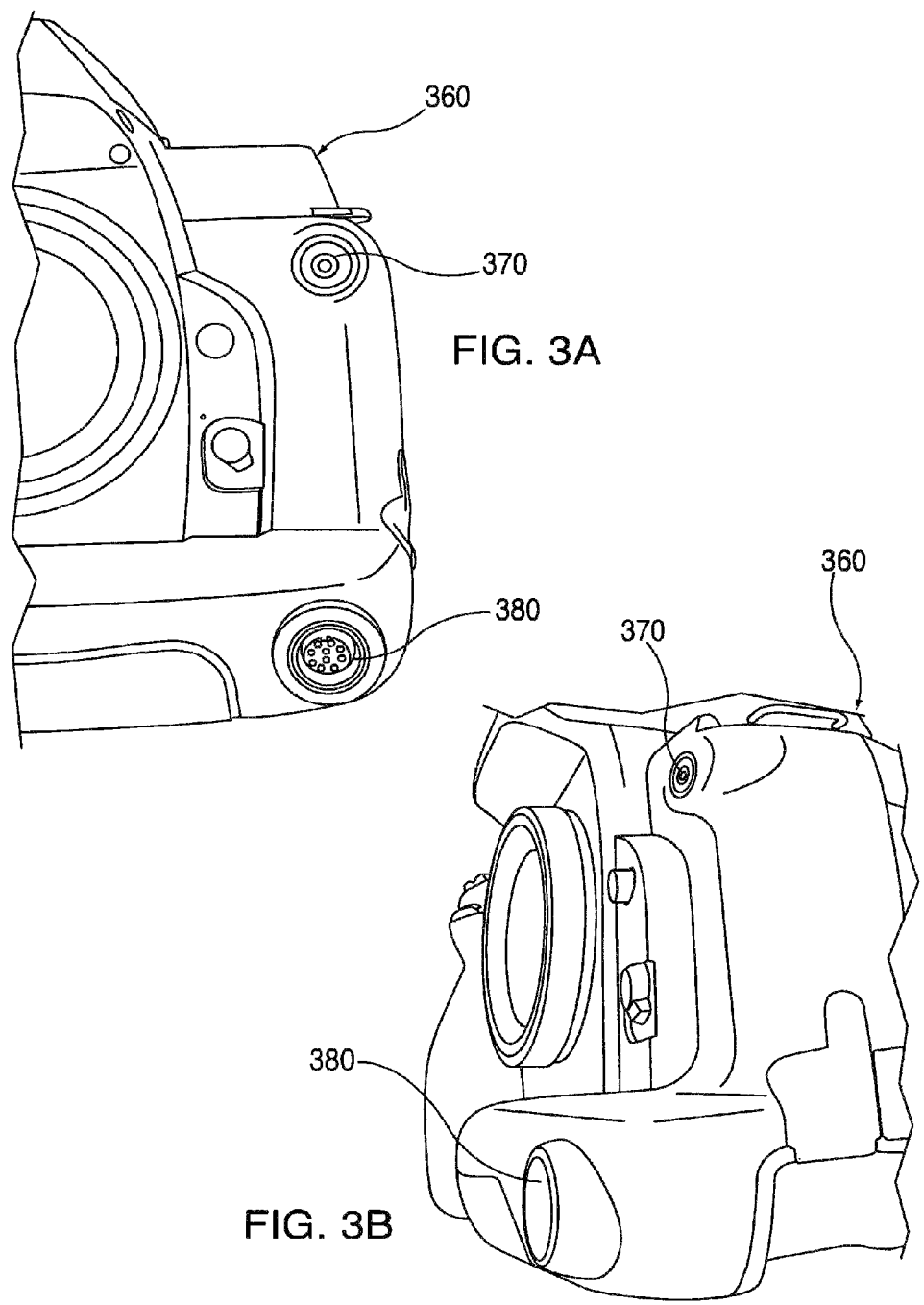
FIG. 3A illustrates a first view of exemplary external ports on yet another example of a camera body.
FIG. 3B illustrates a second view of the exemplary external ports.

FIG. 3A illustrates a front view of yet another example of a camera body 360 having a PC port 370 and a 10-pin motor-drive port 380. FIG. 3B illustrates a side view of camera body 360. As can be seen in FIG. 3B, PC port 370 and motor-drive port 380 are offset from each other in on the front side of camera body 360 and do not appear in substantially the same vertical plane.

FIG. 4A illustrates a first side cross sectional view of one embodiment of a wireless communication module 400. Wireless communication module 400 is shown including a module body 410 having a first pressure connector 420 and a second pressure connector 430. Module body 410 is shown with rectangular sides. In other examples, a module body may take any shape, size, and configuration (e.g., a shape, size, and configuration that suits the camera body to which a connection is desired). In one example, a module body, such as module body 410, may be formed as a unitary unit. In another example, a module body, such as module body 410, may include a plurality of parts that are attached to each other to form a single module body. In yet another example, a module body may include protrusions in the body itself for aesthetic or functional purposes. Protrusion shapes may be utilized to fit a module body to a camera shape such as that in FIG. 3B, where the first and second ports are in different planes of the front side of the camera body.

A module body (or parts of a module body) may be constructed of any material. Examples of materials include, but are not limited to, a rigid plastic, a flexible plastic, a metal, glass filled nylon, and any combinations thereof. In yet another example, a module body may include a flexible and/or articulateable portion (e.g., for allowing movement of one pressure connector with respect to another and/or to allow one or more pressure connectors of a module body to engage one or more ports of a camera body). In still yet another example, a module body is shaped and configured to not obstruct access to external controls of the camera body when the module body is connected to the camera. In a further example, discussed in further detail below with respect to FIGS. 13A and 13B, a module body includes one or more pass-through ports that allow a user to connect another device or connector to a pass-through port to gain access to one or more of the external ports of a camera body to which one or more pressure connectors are connected.

Each of first and second pressure connectors 420 and 430 are on a side of module body 410. In this example, two pressure connectors are shown. However, it is contemplated that any number of one or more pressure connectors may be present in a wireless communication module, such as wireless communication module 400. In one example, one or more pressure connectors are present on the same side/surface of a module body. In another example, two or more pressure connectors are present on a plurality of sides/surfaces of a module body. A pressure connector may include male, female, and/or a combination of male and female components. In one example, as shown in FIG. 4, a pressure connector may protrude from an outer surface of a module body of a wireless communication module. In another example, a pressure connector (e.g., a pressure connector with one or more female components) may be flush with and/or protrude into an outer surface of a module body of a wireless communication module.

Module 400 also includes a transmitter 440 therein for communicating wirelessly with a remote object. In an alternate example, module 400 may include any known wireless communication circuit in place of transmitter 440 that may allow wireless communication to and/or from a remote device. Example wireless communication circuits may include, but are not limited to, a transmitter, a receiver, a transceiver, and any combinations thereof. In one example, a wireless communication module includes a receiver for receiving information from a remote device and communicating the information to a camera body to which the module is connected. In another example, a wireless communication module includes a receiver for receiving information from a remote device and a transmitter for transmitting information to a remote device. In yet another example, a wireless communication module includes a transmitter for transmitting information to a remote device. In still yet another example, a wireless communication module may include a transceiver for receiving information from a remote device and transmitting information to a remote device. Several examples discussed herein cover a module having a transmitter. It should be understood that various combinations exist, including, but not limited to, the transmitter in these examples being accompanied with a receiver, replaced by a receiver, or replaced by a transceiver. It is contemplated that the transmitter element of any of the various embodiments covered herein may actually be satisfied by the use of a transceiver element that includes both a transmitter and receiver component. One example of a transceiver includes a ADF7020-1 model transceiver available from Analog Devices of Norwood, Mass. Other examples of a transmitter, a receiver, and/or a transceiver may be utilized with a wireless communication module.

Transmitter 440 may be in direct or indirect electrical communication with first and second connectors 420 and 430. Transmitter 440 is also in electrical communication with an antenna 445 for providing wireless communication to a camera with a remote device.

An antenna, such as antenna 445, may be internal or external to a module body, such as module body 410. In one example, an antenna is integrally molded with the module body. In another example, an antenna is moveable with respect to the module body. Movement may be in any direction and be achieved by a variety of ways that are known for moveably connecting two pieces. In one example, an antenna may collapse into a module body. In another example, an antenna may fold into a module body. In yet another example, an antenna may be removable from a module body (e.g., via a screw mounting, a snap mounting, and/or other connector). In a further example, where an optical wireless technique is used, an antenna may include an optical sensor and/or an optical emitter. Example optical sensors include, but are not limited to, an infra red (IR) sensor. Example optical emitters include, but are not limited to, an IR light emitting device (LED).

FIG. 4B illustrates a second side view of wireless communication module 400 positioned proximate a first external port 450 and a second external port 460 of a camera body 470. Pressure connectors 420 and 430 are configured to connect to first port 450 and second port 460. In one aspect, such a configuration may have pressure connectors 420 and 430 shaped, sized, and configured to mate with first and second ports 450 and 460. In one example, spacing of pressure connectors 420 and 430 is substantially similar to the spacing of first and second ports 450 and 460. In another example, spacing of pressure connectors 420 and 430 may be modified via moving, flexible, and/or articulating parts, as described below, such that the spacing may substantially match the spacing of first and second ports 450 and 460. Pressure connectors 420 and 430 and ports 450 and 460 are each shown in FIG. 4 having a circular shape. It is contemplated that a pressure connector, such as pressure connectors 420 and 430, may have any shape and/or configuration that enables a direct connection to a desired port of a camera body. In one example, a pressure connector may include a male connecting element for connecting to an external port of a camera body that includes a female connecting element. In another example, a pressure connector may include a female connecting element for connecting to an external port of a camera body that includes a male connecting element. In yet another example, a pressure connector may include a male and a female connecting elements for connecting to an external port of a camera body that include a female and a male connecting elements.

Example ports of a camera body to which a wireless communication module may be connected include, but are not limited to, a synchronization port, such as a PC port; a motor-drive port, such as a 10-pin or 3-pin motor-drive port; a video input and/or output port; a Firewire port; a serial port, such as a USB port; an external power port, such as an external power port of a camera battery; and any combinations thereof. An example motor-drive port may have multiple pins and/or female pin receptors that each provide access to one or more internal functions and/or controls of a camera body. Internal functions and/or controls that may be accessed from a port of a camera body include, but are not limited to, access to direct power that is available even when the camera body is turned off, access to electrical ground, access to switched power, access to regulated power, access to serial communication with camera controls (such as RS-232 communication and universal serial bus "USB" communication), access to data input functionality, communication with "half-press" pre-release trigger control (in some examples referred to as "wakeup"), communication with "full-press" release trigger control (also known as "shutter release"), access to shutter synchronization information, access to internal memory of the camera body; access to an internal processor of the camera body; access to various other controls of the camera body; and any combinations thereof. In one example, when a port provides a pressure connector (and corresponding wireless communication module) access to an internal power supply of a camera, the wireless communication module may utilize the internal power supply as a power supply for the functioning of the module including, but not limited to, powering reception/transmission. In one example, a single port of a camera body may provide access to one internal function/control. In another example, a single port of a camera body may provide access to a plurality of internal function/controls. Throughout this disclosure, where a port is enumerated to give access to a particular one or more of an internal function/control, it should be understood that additional internal functions/controls may be also accessed by that same port. Camera body 470 in FIG. 4 has two ports 450 and 460 that are on the same side of camera body 470. It is contemplated that ports of a camera body may be on different sides of the camera body and require a wireless communication module body that is shaped and configured to connect to ports on a plurality of sides of a camera body (e.g., configured with an articulatable body similar to module body 1510 of FIG. 15 discussed below with an ability to flexibly wrap around two or more sides of a camera body).

In one example, first port 450 may be a port of camera body 470 that provides access to a shutter synchronization signal of camera body 470. An example of a camera port that provides access to a shutter synchronization signal of a camera includes, but is not limited to, a synch port (also known as a PC port). In another example, second port 460 is a port of camera body 470 that provides access to an internal power supply of camera body 470. Example camera ports that provide access to an internal power supply of a camera include, but are not limited to, a motor-drive port, an IEEE 1394 (Firewire) port, a universal serial bus port, an external power port of a removable camera battery, accessory port, and any combinations thereof.

FIG. 4C illustrates module body 410 connected to camera body 470. In one example, when module 400 is connected to camera body 470 via first and second connectors 420 and 430, a power supply internal to camera 470 may provide power to transmitter 440 via second port 460 and second pressure connector 430. In another example, when module 400 is connected to camera body 470 via first and second pressure connectors 420 and 430, transmitter 440 is in communication with shutter synchronization information internal to camera body 470 via first connector 420. Camera body 470 includes a lens 480 attached thereto.

A pressure connector, such as pressure connector 420 and/or pressure connector 430, may provide direct connection of a module body to a port of a camera body in a variety of ways. In one example, a pressure connector is sized and configured to fit snugly within, and/or around, a port of a camera body so that friction of the snug fit maintains the connection. The size and configuration of a pressure connector will depend on the size and configuration of a port of a camera body to which the pressure connector is designed to mate. In another example, one or more pressure connectors of a module body, when connected to one or more ports of a camera body, provide a portion or all of the structural support to hold the module in direct connection with the camera body (e.g., friction between one or more pressure connectors and the one or more ports of the camera body and a level of rigidity of the materials selected for construct of the one or more pressure connectors and/or the module body of the wireless communication module may provide the only structural support necessary to hold the module in place in direct connection with a camera body). In yet another example, a pressure connector may include a screw connect element that can provide a screw connection to a port of a camera body. In still yet another example, a pressure connector includes a button or other element to release the connection with a port of a camera body. In a further example, a pressure connector includes a snap-type connect element that allows the pressure connector to snap into a port of a camera body. Various friction fit, screw connection, and snap connection elements will be understood by those of ordinary skill in light of the present disclosure.

Figure 5:
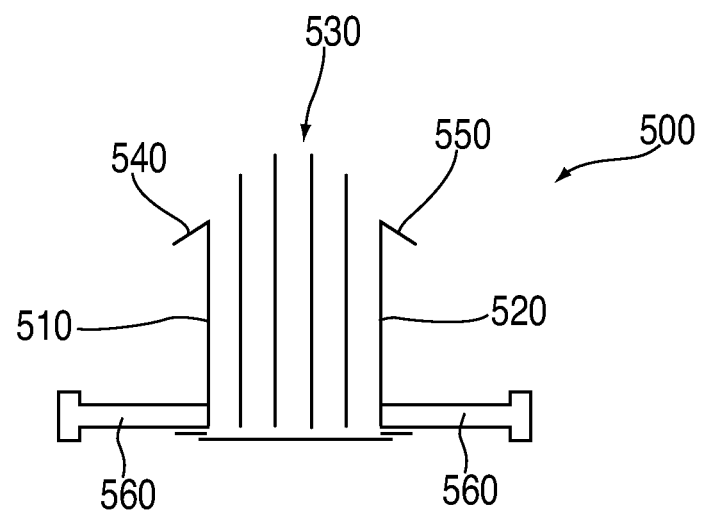
FIG. 5 illustrates one example of a snap type connector.

FIG. 5 illustrates a cross section of an example snap-type connect element 500 for a pressure connector. Connect element 500 includes hook members 510 and 520. Male pins 530 of an example pressure connector are between hook members 510 and 520. Male pins 530 may provide electrical communication with female counterparts of a port of a camera body when the pressure connector is engaged with the port. It is contemplated that male pins 530 may be replaced by one or more female connector elements depending on the configuration of the port of the camera body to which the pressure connector is to engage. Hook members 510 and 520 include an angled end 540 and 550, respectively. In one example, pressure may be applied to a module body of which connect element 500 is a part. The pressure may cause connect element 500 to be inserted within, or come in contact with, a port of a camera body. In this example, angled ends 540 and 550 may compress inward toward pins 530 as a pressure connector contacts the sides of a port of a camera body and make secure contact with a surface of the port. Connect element 500 also includes connection release element 560, which may be depressed inward to release the contact of angled ends 540 and 550 with the surface of the port.

In another embodiment, a wireless communication module may be permanently attached to a camera body. In one example, an outer covering of a camera body (e.g., a rubber grip component of a camera body) may be removed and a wireless communication module connected to one or more ports of the camera in an area proximate the removed outer covering. The module body of the wireless communication module may be sized shaped and configured to replace the removed outer covering. An adhesive, one or more screws, or other permanent or releasable attachment techniques may be used to adhere the module body to the camera body. In one example, a module body may be contoured to provide a grip to the camera body. In another example, a module body may be configured to conform to the general shape of the camera body and to not obscure access to camera controls.

FIG. 6A illustrates a first side cross sectional view of another embodiment of a wireless communication module 600. Wireless communication module 600 includes a module body 610. Module body 610 includes a first pressure connector 620 and a second pressure connector 625, each on a side of module body 610. First pressure connector 620 is configured to connect to a first port 640 of a camera body 650. Second pressure connector 625 is configured to connect to a second port 645 of camera body 650. In one example, first port 640 provides access to a shutter synchronization signal of camera body 650 to wireless communication module 600. In another example, second port 645 provides access to an internal power supply of camera body 650 to wireless communication module 600. First and second pressure connectors 620 and 625 are in communication with a transmitter 660. First pressure connector 620 may be in communication with a shutter synchronization signal module 665 for receiving a shutter synchronization signal. A shutter synchronization signal module (synchronization signal module) may include any necessary circuitry to receive and/or deliver information from/to a port of a camera body to a transmitter and/or processor of a wireless communication module. In one example, a synchronization signal module may include minimal circuitry (e.g., as little as a wired connection) sufficient to provide an electrical communication between a pressure connector and a transmitter and/or processor of a wireless communication module. In another example, a shutter synchronization signal module, such as shutter synchronization signal module 665, may include more detailed circuitry for communicating data to and/or from a port of a camera body to which a corresponding pressure connector is directly engaged (e.g., routing circuitry, a memory element, internal processing capabilities, machine readable instruction, etc.). Second pressure connector 625 may be in communication with a power management module 670 for receiving power from a power supply internal to camera body 650 and providing the power to module body 610. In one example, a power management module may include any necessary circuitry to provide electrical communication between a pressure connector and a transmitter and/or processor of a wireless communication module (e.g., as little as a wired connection). In another example, a power management module may include more detailed circuitry to provide power management to a wireless communication module (e.g., routing circuitry, a memory element, internal processing capabilities, machine readable instruction, etc.) Power management module 670 may be in communication with transmitter 660 for providing power to transmitter 660. Shutter synchronization signal module 665 may also be in communication with transmitter 660 for providing information to transmitter 660.

Optionally, module body 610 may include a processor 675 for processing information received and/or transmitted by communication module 600. Power management module 670 and shutter synchronization signal module 665 may be in communication with optional processor 675. Processor 675 may be in communication with transmitter 660. Transmitter 660 is in communication with antenna 680 for wirelessly communicating with a remote device. In one example, a processor, such as processor 675, may be used to encode transmissions from a wireless communication module and to decode transmissions received by a wireless communication module. In another example, a processor may manage information received wirelessly by a wireless communication module, received from a camera body to which the module is connected, and any combinations thereof. Example processors include, but are not limited to, a microcontroller, a digital signal processor, a field programmable gate array, a programmable logic device (PLD), and any combinations thereof. A processor, such as processor 675 may utilize information, such as settings, algorithms, and/or software instructions (e.g. machine readable instructions), present in an optional memory element that is separate from and/or integrated with the processor. One example of a processor includes a ATMega168 model processor available from Atmel of San Jose, Calif.

Figure 7:
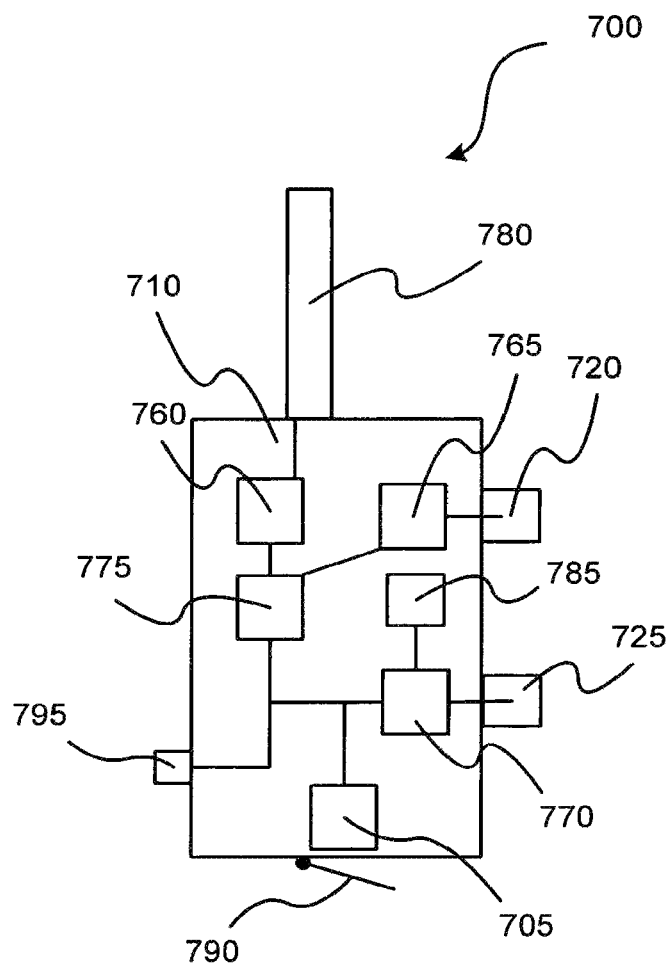
FIG. 7 illustrates yet another example of a wireless communication module having an internal power supply.

FIG. 6C shows module body 610 in direct connection with camera body 650 via first and second pressure connectors 620 and 625. As discussed above, a module body may have any shape, size, and configuration to suit the use with a particular camera body. In one example, module body 610 may be contoured to form a grip suitable for a human hand in order to assist with holding camera body 650. Camera body 650 includes a lens 685 attached thereto Power for a wireless communication module, such as wireless communication module 600, may be provided in a variety of ways. In one example, a wireless communication module, such as module 600, may receive power solely through one or more pressure connectors from a power supply of a camera to which the module is attached. FIG. 7 illustrates one embodiment of a wireless communication module 700 that includes an internal power supply 705. Wireless communication module 700 includes a module body 710 having a first pressure connector 720 and a second pressure connector 725 each configured to connect with a corresponding external port of a camera body and to provide wireless communication to and/or from a remote device to the camera body via a transmitter 760. First pressure connector 720 may be in communication with a shutter synchronization signal module 765. Second pressure connector 725 may be in communication with a power management module 770. In one example, shutter synchronization signal module 765 and power management module 770 may be in communication with an optional processor 775, as discussed above with respect to wireless communication module 600. In another example, shutter synchronization signal module 765 and/or power management module 770 may be in direct communication with transmitter 760. Transmitter 760 is in communication with antenna element 780 for wirelessly communicating with a remote device. Internal power supply 705 is in communication with, and may be managed by, power management module 770. Processor 760 may assist power management module 770 in managing internal power supply 705 and/or power provided from a connected camera body via second pressure connector 725. Example management of internal power supply 705 includes, but is not limited to, delivery of power to one or more components of wireless communication module 700, recharging of internal power supply 705, dividing power supply between internal power supply 705 and other power sources (e.g., a connected camera body), and any combinations thereof. Examples of internal power supplies include, but are not limited to, a battery (e.g. a coin cell), a fuel cell, and any combinations thereof. An internal power supply may be rechargeable. Example sources of power for recharging an internal power supply include, but are not limited to, power from a connected camera body, an outside power source (e.g., connection to a 110 V A/C outlet or low voltage A/C adapter). In one example, a module internal power supply may recharge via a trickle charge from a camera internal power supply when the camera is in low power sleep (standby) mode. This is practical because cameras are often sitting in standby mode for periods of many seconds to several minutes between photos.

Wireless communication module 700 may include an optional capacitor 785 or similar module for storing power. Capacitor 785 may be a part of, or a separate circuit from, power management module 770. In one example, capacitor 785 may store power received from a camera power supply. This may be useful in an example where the camera power supply accessed by the module is below what is required to operate a wireless communication module on a full-time basis. An example of such a power supply having a current of about 2.5 mA power may be accessed via a Firewire port of a camera body. Capacitor 785 may store power and use it at select intervals, such as when transmission is required or reception is desired.

In another embodiment, internal power supply 705 may be removable. Module body 710 may include an optional door or compartment 790 for receiving a removable internal power supply. A module body may also include an optional external connector 795 for connecting an external power supply, such as a standard 110 V A/C outlet or low voltage A/C adapter, to the internal power supply for recharging the internal power supply and/or providing alternate power to module 700. In one example, wireless communication module 700 may access power internal to a camera body via a pressure connector, such as pressure connector 725, to a port of the camera body and also have its own internal/external power supply (e.g., internal power supply 705 and/or external power via external connector 795. In this example, the wireless communication module may utilize the power supply of the camera, especially if the camera power supply is a low current power supply, to maintain the general functioning of the module and also utilize its own internal/external power supply during transmission from the module to a remote device. This example, may utilize smaller current from the camera without the use of a capacitor. However, a capacitor in combination with this example is also contemplated.

A wireless communication module may also obtain power through a pressure connector from a dedicated port of a camera body for providing power and/or an external port of a battery pack associated with a camera body. FIGS. 8A, 8B, and 8C illustrate exemplary wireless communication module 800 that is configured to connect to an external power port 805 (e.g., a power port providing access to an internal power supply) of a camera body 810 and/or an external power port 815 of a battery 820 associated with camera body 810. FIG. 8A illustrates a first side view of module 800 having a first pressure connector 825 and a second pressure connector 830. FIG. 8B illustrates a second side cross sectional view of module 800 in proximity to one example camera body 810. Camera body 810 includes a first external port 835 and external power port 805. Wireless communication module 800 includes a synchronization signal module 840 in communication with first pressure connector 825 and a power management module 845 in communication with second pressure connector 830, each of which may be in communication with an optional processor 850. Synchronization signal module 840 and power management module 845 may each be in direct communication, or communication via processor 850, with a transmitter 860, which is in communication with an antenna element 865 for wirelessly communicating with a remote device. Pressure connectors 825 and 830 are configured to be brought into direct connection with first external port 835 and external power port 805, respectively. Power may be provided via second pressure connector 830 from external power port 805 to wireless communication module 800. Other signals (e.g., a shutter synchronization signal) may be provided to wireless communication module 800 via the direct connection of first pressure connector 825 and first external port 835.

FIG. 8C illustrates a side cross sectional view of module 800 in proximity to another example camera body 810 having a first external port 835. Camera body 810 also includes an opening 870 for receiving a removable battery 820 having an external power port 815 for providing access to power supplied by battery 820. In this example, pressure connectors 825 and 830 are configured to be brought into direct connection with first external port 835 and external power port 815. Wireless communication module 800 may be configured to use power via second pressure connector 830 to power part or all of the functions of the wireless communication module. In one example, wireless communication module 800 may also use the voltage from power of a camera body to determine a shutter synchronization as discussed further below. In another example, the wireless communication module may also have one or more additional pressure connectors that are configured to connect to one or more additional ports of the camera body as discussed herein. Camera body 810 also includes a lens 880 attached thereto.

Figure 9:
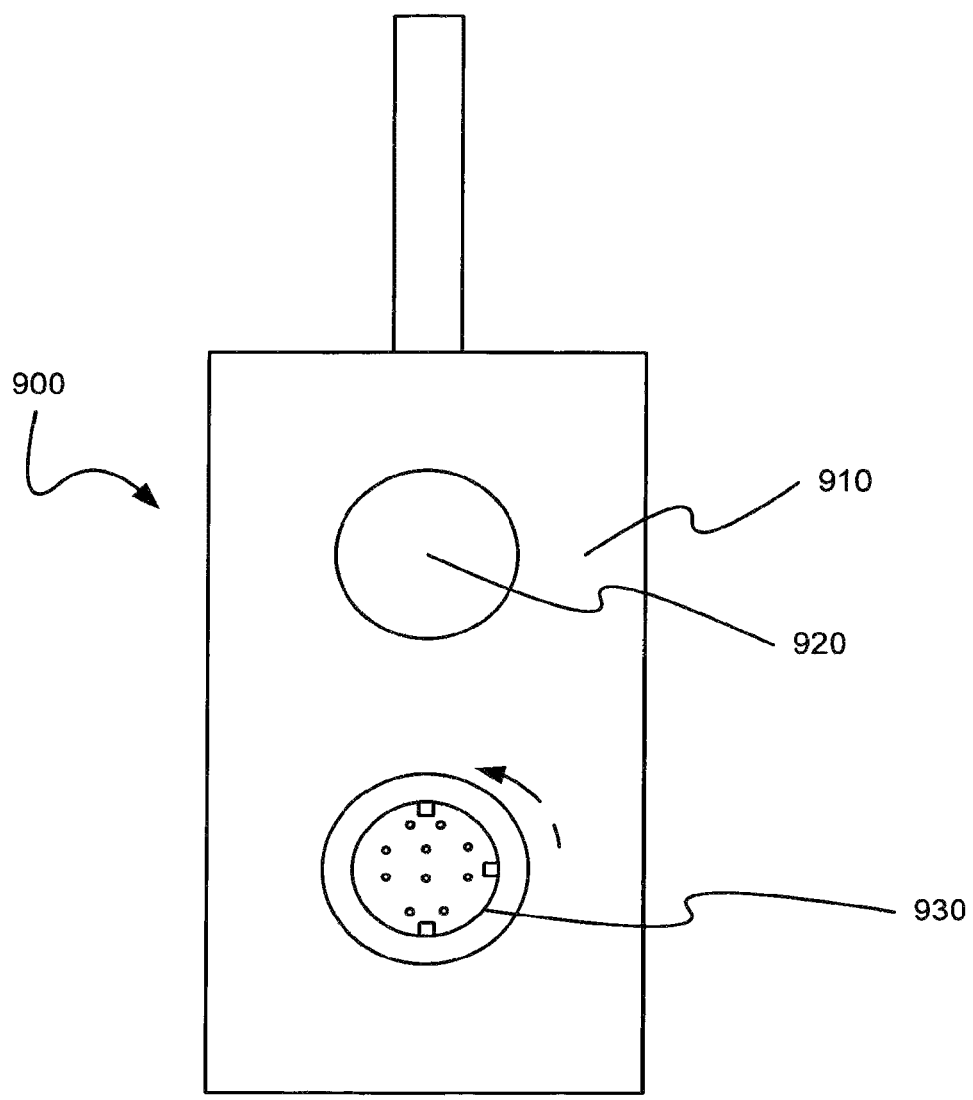
FIG. 9 illustrates an exemplary rotatable pressure connector.

A pressure connector for connecting a wireless communication module to a camera may be moveable with respect to each other and/or a module body. FIG. 9 illustrates one example of a wireless communication module 900 having a module body 910. Module body 910 includes a first pressure connector 920 and a second pressure connector 930. Second pressure connector 930 is rotatably mounted so that it can rotate around its center. One example of a rotatable mounting includes a connector mounted in an opening in a module body and having a flex mounted circuit and/or flexible wire leads. It should be noted that first pressure connector 920 may also be rotatably mounted instead of, or in addition to, second pressure connector 930.

Figure 10:
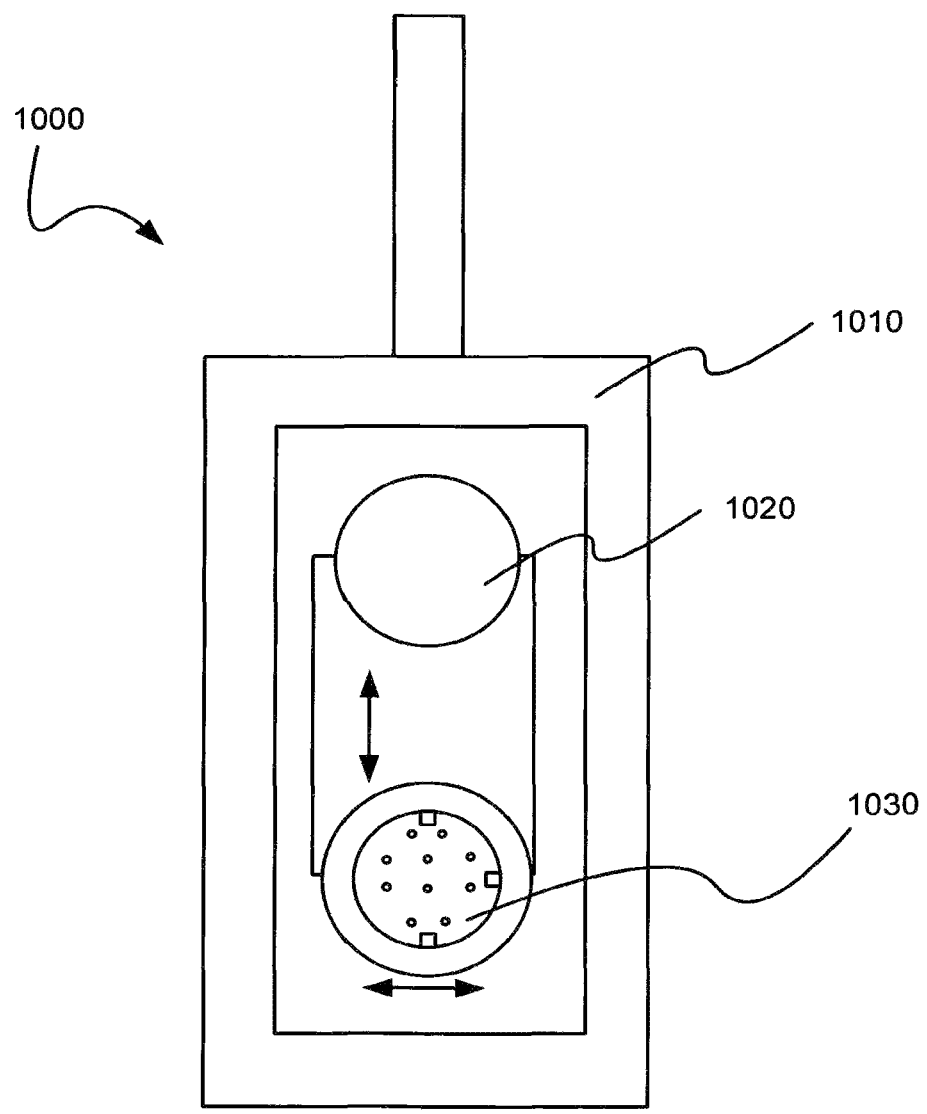
FIG. 10 illustrates an exemplary moveable pressure connector.

FIG. 10 illustrates another example of a wireless communication module 1000 having a module body 1010. Module body 1010 includes a first pressure connector 1020 and a second pressure connector 1030. First pressure connector 1020 is mounted so that it may move with respect to second connector 1030. In yet another example, second pressure connector 1030 is mounted so that it may move with respect to first pressure connector 1020. Movement of a pressure connector may occur in any direction and be facilitated by any means of mounting one object with respect to another. In a further example, a pressure connector is moveable into and out from a module body while still remaining integral to the module body. One way to facilitate such movement includes the use of a spring element. Other examples of flexible mounting of a pressure connector include, but are not limited to, use of a flex circuit that allows a circuit element to move with respect to another circuit element, a semi rigid spring wire bent to shape that can flex while returning to original position when not under tension, and any combination thereof.

FIGS. 11A, 11B, and 11C illustrate a first and second side views of yet another wireless communication module 1100 configured for direct connection to a camera body 1160. Wireless communication module 1100 includes a module body 1110. Module body 1110 includes a first pressure connector 1120, a second pressure connector 1130, and a third pressure connector 1140. Wireless communication module 1100 also includes an antenna 1145. It should be noted that although wireless communication module 1100 is shown from an external perspective that it may include internal circuitry (e.g., a transmitter, other elements, and supporting connecting circuitry) consistent with, and as will be apparent from, the current disclosure. First pressure connector 1120 is configured for connection with a first external port 1150 of a camera body 1160. In one example, first pressure connector 1120 includes a PC connector. Second pressure connector 1130 is configured for connection with a second external port 1170. In another example, second pressure connector 1130 includes a motor-drive connector. Third pressure connector 1140 is configured for connection with a third external port 1180. In one example, third pressure connector 1140 includes a Firewire connector. A fourth pressure connector 1190 may also be configured to connect to a fourth port 1195 of camera body 1160. In one example, fourth pressure connector includes a USB connector. FIG. 11D shows module body 1110 in direct connection with camera body 1160. In one example, third external port 1180 is a Firewire port that provides power to wireless communication module 1100 via third connector 1140. Various signals and/or power as discussed above may be provided to wireless communication module 1100 via any one or more of pressure connectors 1120, 1130, 1140, and 1190. One or more of such signals may be wirelessly communicated to a remote device.

Figure 12A:
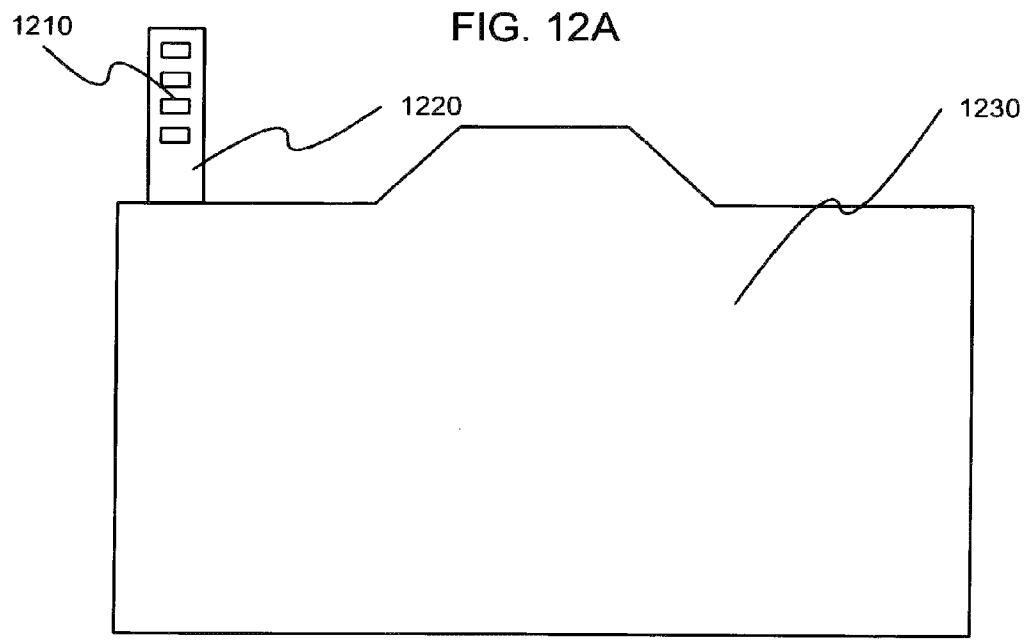
FIG. 12A illustrates a back view of an example camera having one example of a wireless communication module directly connected thereto.
Figure 12B:
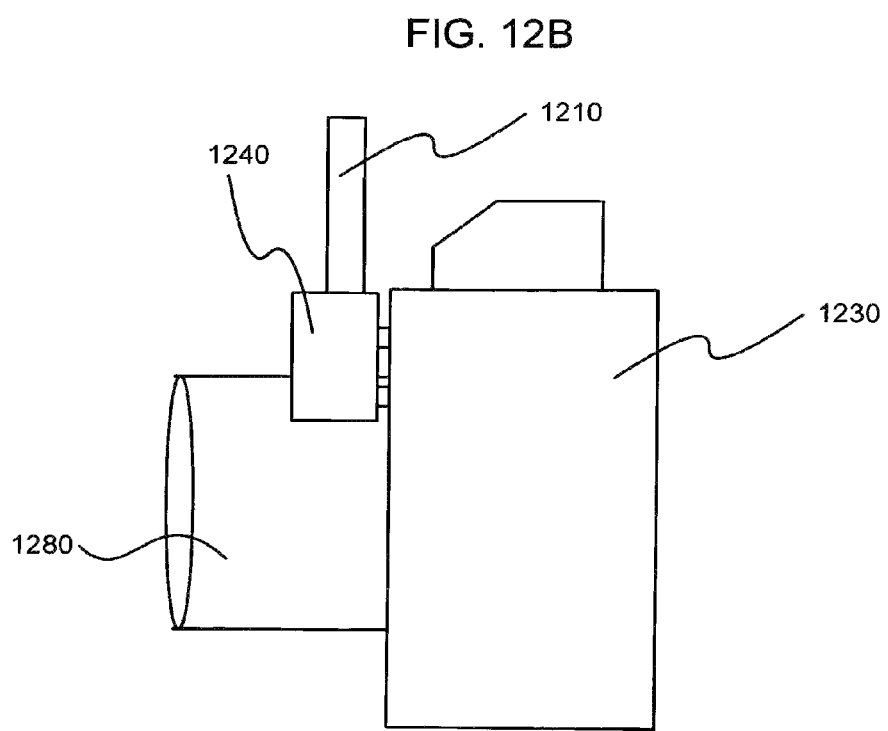
FIG. 12B illustrates a side view of the example camera with the example wireless communication module directly connected thereto.

A wireless communication module may also include one or more external visual indicators for providing information about an internal status of the module. Example visual indicators include, but are not limited to, a video screen, an LCD, an LED, a light, plasma display element, and any combinations thereof. FIGS. 12A and 12B illustrate one example of a visual indicator 1210 configured on a surface of an antenna 1220 of a wireless communication module. FIG. 12A shows the view of the back side of a camera body 1230 having a wireless communication module connected thereto. Antenna 1220 includes visual indicator 1210 having one or more LED's that are visible to a user from behind camera body 1230. FIG. 12B shows a module body 1240 of the wireless communication module connected to camera body 1230. In one example, the one or more LED's may indicate a wireless communication channel utilized by a wireless communication module. Camera body 1230 includes a lens 1280 attached thereto.

Figures 13A, 13B:
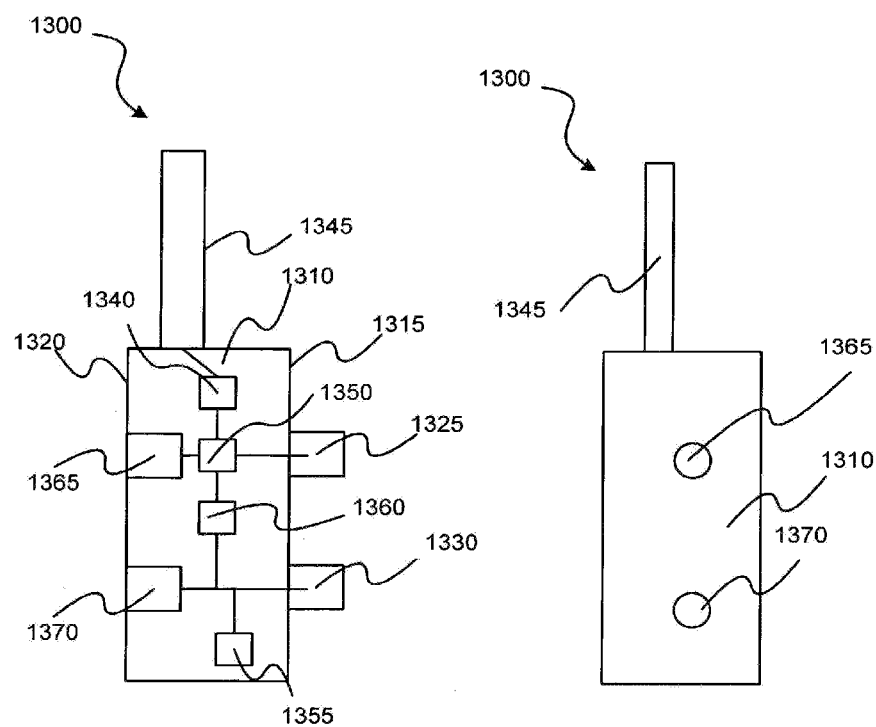
FIG. 13A illustrates a first view of yet a further example of a wireless communication module having an example of a pass-through connector.
FIG. 13B illustrates a second view of the example wireless communication module.

A wireless communication module may also include one or more pass through ports in communication with a connector, as discussed above, for allowing a user to connect another device to the connector while the wireless communication module is connected to the camera. FIG. 13A illustrates a first side cross sectional view of a wireless communication module 1300 having a module body 1310 with a first module side 1315 and a second module side 1320. Module body 1310 includes on first module side 1315 a first pressure connector 1325 and a second pressure connector 1330. First pressure connector 1325 is shaped, sized, and configured to engage a first port of a camera body to which wireless communication module 1300 may be connected to provide wireless communication capability to the camera body as discussed herein. Second pressure connector 1330 is shaped, sized, and configured to engage a second port of a camera body. First pressure connector 1325 is in communication with a transmitter 1340, which is in communication with an antenna element 1345. A synchronization signal module 1350 is in communication with transmitter 1340 and first pressure connector 1325. Second pressure connector 1330 is in communication with a power management module 1355. An optional processor 1360 is in communication with synchronization signal module 1350 and power management module 1355. Processor 1360 may provide information and power management, as well as other processing functionality, for wireless communication module 1300. Second module side 1320 includes a first pass-through connector 1365 and a second pass-through connector 1370.

First pass-through connector 1365 is sized, shaped, and configured to match the first port of the camera body for providing an ability to utilize the first port of the camera body when wireless communication module 1300 is connected to the camera body. Second pass-through connector 1370 is sized, shaped, and configured to match the second port of the camera body for providing an ability to utilize the second port of the camera body when wireless communication module 1300 is connected to the camera body. FIG. 13B illustrates a view of second module side 1320 showing pass-through connectors 1365 and 1370. First pass-through connector 1365 is in electrical communication with first pressure connector 1325 for providing electrical communication with a connected port of a camera body. In one example, synchronization signal module 1350 may include routing circuitry to properly route one or more signals between first pass-through connector 1365 and first pressure connector 1325 (e.g., routing information from the camera body to transmitter 1340 and routing signals from a device connected to first pass-through connector 1365 through to first pressure connector 1325). Second pass-through connector 1370 is in electrical communication with second pressure connector 1330 for providing electrical communication with a connected port of a camera body. In one example, power management module 1355 may include routing circuitry to properly route one or more signals between second pass-through connector 1370 and second pressure connector 1330 (e.g., routing power from the camera body to provide power to wireless communication module 1300 and routing signals from a device connected to second pass-through connector 1370 to second pressure connector 1330). Although, wireless communication module 1300 includes a pass-through port for each pressure connector, it is contemplated that a pass-through connector may be provided for less than all pressure connectors of a wireless communication module.

In still another embodiment, a wireless communication module may include an audio element for providing an audio signal indicative of a state of the module. Examples of audio elements include, but are not limited to, a speaker, piezo buzzer, and any combinations thereof. A wireless communication module may also include one or more external controls for changing/controlling an internal state of the module. External controls include, but are not limited to, a button, a trigger, a toggle, knob, joystick, and any combinations thereof. Examples of the internal states that may need changing and/or indication include, but are not limited to, channel of operation, frequency of operation, device address, receive or transmit mode, type of camera that it will communicate with, and any combinations thereof. A visual and/or audio indication may be provided in a variety of ways including, but not limited to, quantity of indications, spoken word, a displayed image, a displayed character, and any combinations thereof. In another example, an internal state may be modified using wireless communication to a wireless communication module via the wireless communication capability of the module.

Figures 14A, 14B:
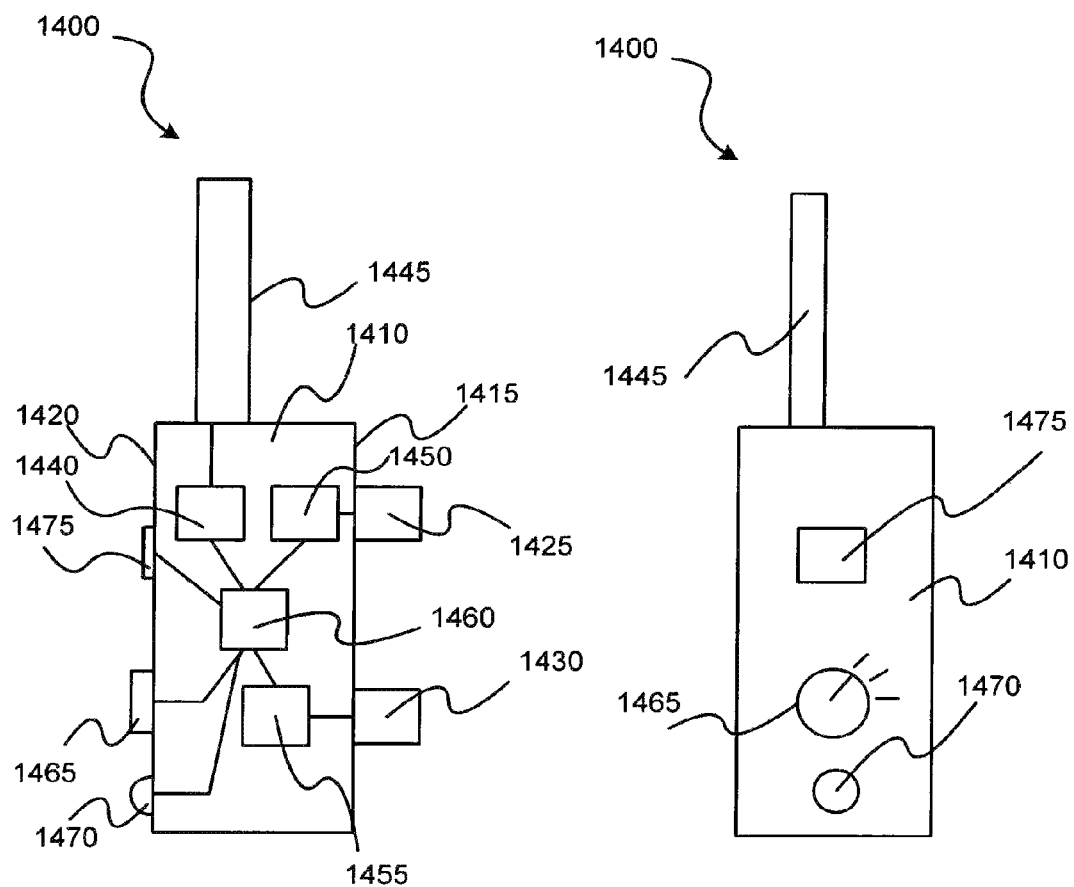
FIG. 14A illustrates a first view of still a further example of a wireless communication module having an exemplary external control.
FIG. 14B illustrates a second view of the example wireless communication module.

FIG. 14A illustrates still yet another embodiment of a wireless communication module 1400 having a module body 1410 with a first module side 1415 and a second module side 1420. Module body 1410 includes on first module side 1415 a first pressure connector 1425 and a second pressure connector 1430. First pressure connector 1425 is shaped, sized, and configured to engage a first port of a camera body to which wireless communication module 1400 may be connected to provide wireless communication capability to the camera body as discussed herein. Second pressure connector 1430 is shaped, sized, and configured to engage a second port of a camera body. First pressure connector 1425 is in communication with a transmitter 1440, which is in communication with an antenna element 1445. A synchronization signal module 1450 is in communication with transmitter 1440 and first pressure connector 1425. Second pressure connector 1430 is in communication with a power management module 1455. An optional processor 1460 is in communication with synchronization signal module 1450 and power management module 1455. Processor 1460 may provide information and power management, as well as other processing functionality, for wireless communication module 1400. In one example, second module side 1420 may include an external control 1465 in communication with processor 1460 for setting and/or modifying an internal state of wireless communication module 1400. External control 1465 is shown as a dial. External control 1465 may additionally, or in substitute, include one or more other external controls.

In another example, second module side 1420 may include an audio element 1470 in communication with processor 1460 for providing an audible indication of a status and/or change of an internal state of wireless communication module 1400. In one example, processor 1460 may provide instructions and/or an electrical signal to audio element 1470 for producing an audible indication representing a current status (e.g., a certain number and/or quality of audible indication may provide specific information about the state of the module). In another example, processor 1460 may provide instructions and/or an electrical signal to audio element 1470 for producing an audible indication representing a change in status (e.g., an audible indication may be provided when a user modifies a status with an external control, such as external control 1465).

In still another example, second module side 1420 may include a visual indicator 1475 in communication with processor 1460 for providing a visual indication of a status and/or change of an internal state of wireless communication module 1400. Any number and/or combination of visual indicators may be included in wireless communication module 1400. Example visual indicators are discussed above.

In a further embodiment, an external control (e.g., external control 1465) on a wireless communication module may be configured to be used alone to communicate with an internal state of the module and/or be configured to be used in combination with one or more controls of a camera body to which it is attached. In one example, wireless communication module 1400 may have access to a camera control (e.g. trigger control) of a camera body via one or more of pressure connectors 1425, 1430 and a port of the camera body (e.g., a motor-drive port). In such an example, external control 1465 may be configured (e.g., via machine readable instruction associated with processor 1460, such as in a memory) to activate at the same time as (or in a predetermined sequence with) the camera control (e.g., when a full and/or partial trigger signal is receive via a pressure connector). In one aspect, this may allow a user to control a state, such as channel of operation, of the wireless communication module so that the state does not erroneously change by a single inadvertent button activation. In another example, an external control of a wireless communication module may work in conjunction with a visual indicator. In yet another example, an external control includes a visual indicator integrated therewith (e.g., a pressure sensitive display element, such as a pressure sensitive LED or LCD).

A wireless communication module (e.g., wireless communication module 1400) may utilize an external control to power on and/or off the wireless communication module or one or more aspects of the wireless communication module. In still another example, a wireless communication module may power on by sensing connection to a port of a camera body. In such an example, a processor, such as processor 1460 may have associated therewith instructions for detecting an information and/or power provided via one or more pressure connectors in direct communication with one or more ports of the camera body. In still yet another example, a wireless communication module may be configured to have an internal state modified and/or controlled by one or more camera controls of a camera body to which the module is connected (e.g., a processor, such as processor 1460 may include instructions for detecting a signal provided via one or more pressure connectors in direct communication with one or more ports of the camera body and to set and/or alter a state of the wireless communication module based on the signal). In a further example, an internal state of a wireless communication module may be indicated by a visual indicator of a camera body to which the wireless communication module is connected. In such an example, a processor, such as processor 1460, may provide information to a processor of the camera body via one or more pressure connectors in direct communication with one or more ports of the camera body. The processor of the camera body may utilize a visual display element of the camera body (e.g., an LED and/or LCD display) to display an indication of the wireless communication module status.

Figure 15A:
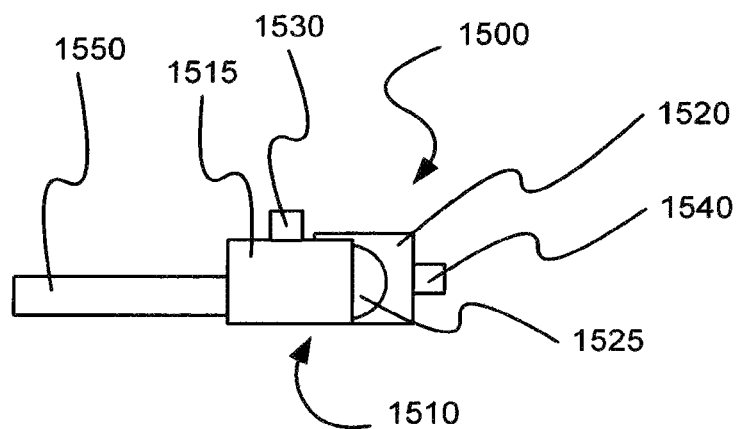
FIG. 15A illustrates a first view of yet still a further example of a wireless communication module.
Figure 15B:
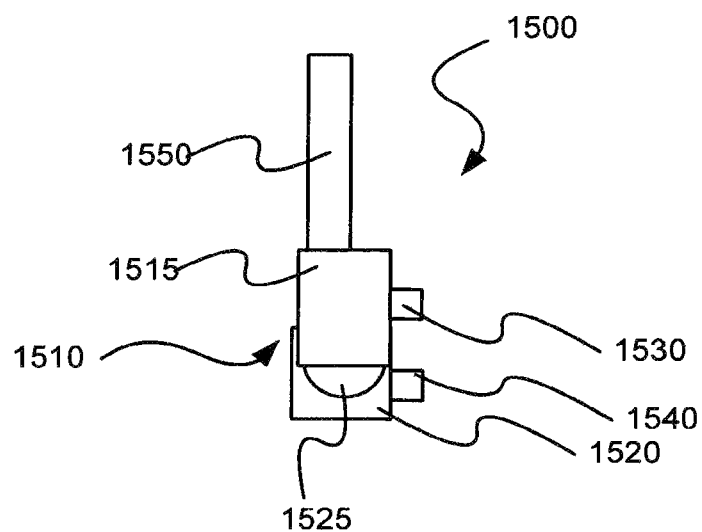
FIG. 15B illustrates a second view of the example wireless communication module.

FIGS. 15A and 15B illustrate a further exemplary embodiment of a wireless communication module 1500 having a module body 1510. It should be noted that although wireless communication module 1500 is shown from an external perspective that it may include internal circuitry (e.g., a transmitter and supporting connecting circuitry) consistent with, and as will be apparent from, the current disclosure. FIG. 15A shows a first view of wireless communication module 1500. Module body 1510 includes a first portion 1515 and a second portion 1520 that are articulateable with an articulation element 1525. Module body 1510 includes a first pressure connector 1530 and a second pressure connector 1540. Wireless communication module 1500 also includes an antenna 1550. Module body 1510 in FIG. 15A is in a position that allows connection of second pressure connector 1540 to a port of a camera body by applying pressure to module body 1510 in such a manner as to direct second pressure connector 1540 into connection with that port. FIG. 15B shows module body 1510 in a position after first portion 1515 has been articulated upward. This movement can allow connection of first pressure connector 1530 to a second port on the same side of a camera as the first port. In one example, second pressure connector 1540 may have a screw connection that requires rotation of the entire module body 1510. After screw connection of second pressure connector 1540 is completed with a first port, first portion 1515 may be articulated into place to connect first pressure connector 1530 to a second port. In one example, an articulating element includes a flexible portion of a module body that allows the module body to articulate. In another example, a module body having an articulating element is shaped and configured to articulate such that a first pressure connector can connect to a port on one side of a camera body and a second pressure connector can connect to a port on a second side of a camera body.

Figure 16A:
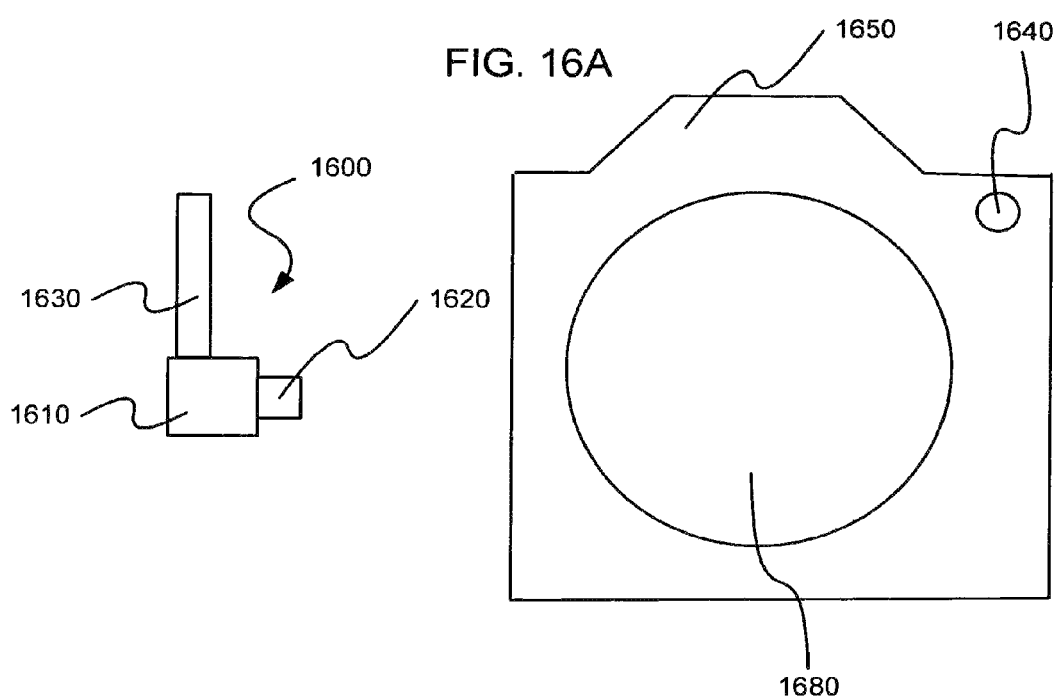
FIG. 16A illustrates one example of a wireless communication module in proximity to an example camera.
Figure 16B:
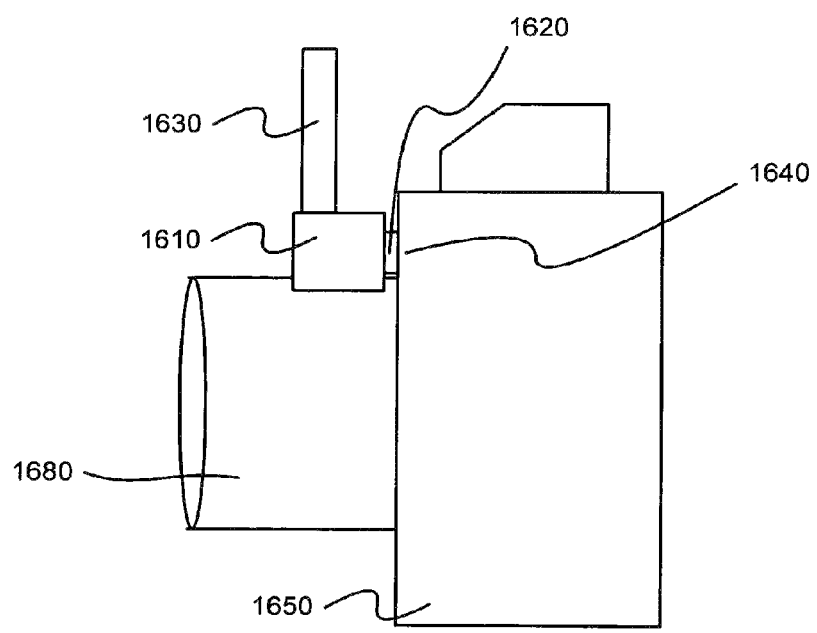
FIG. 16B illustrates the example wireless communication module directly connected to the example camera.

FIGS. 16A and 16B illustrate a further exemplary embodiment of a wireless communication module 1600. It should be noted that although wireless communication module 1600 is shown from an external perspective that it may include internal circuitry (e.g., a transmitter and supporting connecting circuitry) consistent with, and as will be apparent from, the current disclosure. FIG. 16A shows wireless communication module 1600 including a module body 1610 and a first pressure connector 1620. Wireless communication module 1600 also includes an antenna 1630. First pressure connector 1620 is configured to connect to a port 1640 of a camera body 1650. FIG. 16B shows wireless communication module 1600 directly connected to camera body 1650 via first pressure connector 1620 and port 1640. In one example, port 1640 provides first pressure connector 1620 access to one or more internal functions/controls including access to an internal power supply of camera body 1650 and access to a trigger control of camera body 1650. In another example, port 1640 provides first pressure connector 1620 access to one or more internal functions/controls including access to an internal power supply of camera body 1650. In yet another example, port 1640 provides first pressure connector 1620 access to a synchronization signal of camera body 1650 (e.g., for wirelessly transmitting a synchronization signal to a remote device for synchronizing the remote device with image acquisition by camera body 1650. In such an example, wireless communication module 1600 may also include an internal power supply for providing power to the module. Camera body 1650 also includes a lens 1680 attached thereto.

As discussed above, wireless communication can be used for a variety of purposes. Examples of uses for a wireless communication module include, but are not limited to, wirelessly controlling the function and/or triggering of a remote flash, wirelessly controlling the function and/or triggering of a remote camera, wirelessly controlling the camera to which the module is connected from a remote device, wirelessly communicating information to and/or from a remote device, wirelessly receiving information from and/or transmitting information to a remote light meter and/or color spectrum meter, and any combinations thereof. Any of the embodiments discussed herein may utilize direct connection to a camera body and access to appropriate internal functions/controls through a pressure connector to port connection to accomplish any of these and other uses.

Figure 17:
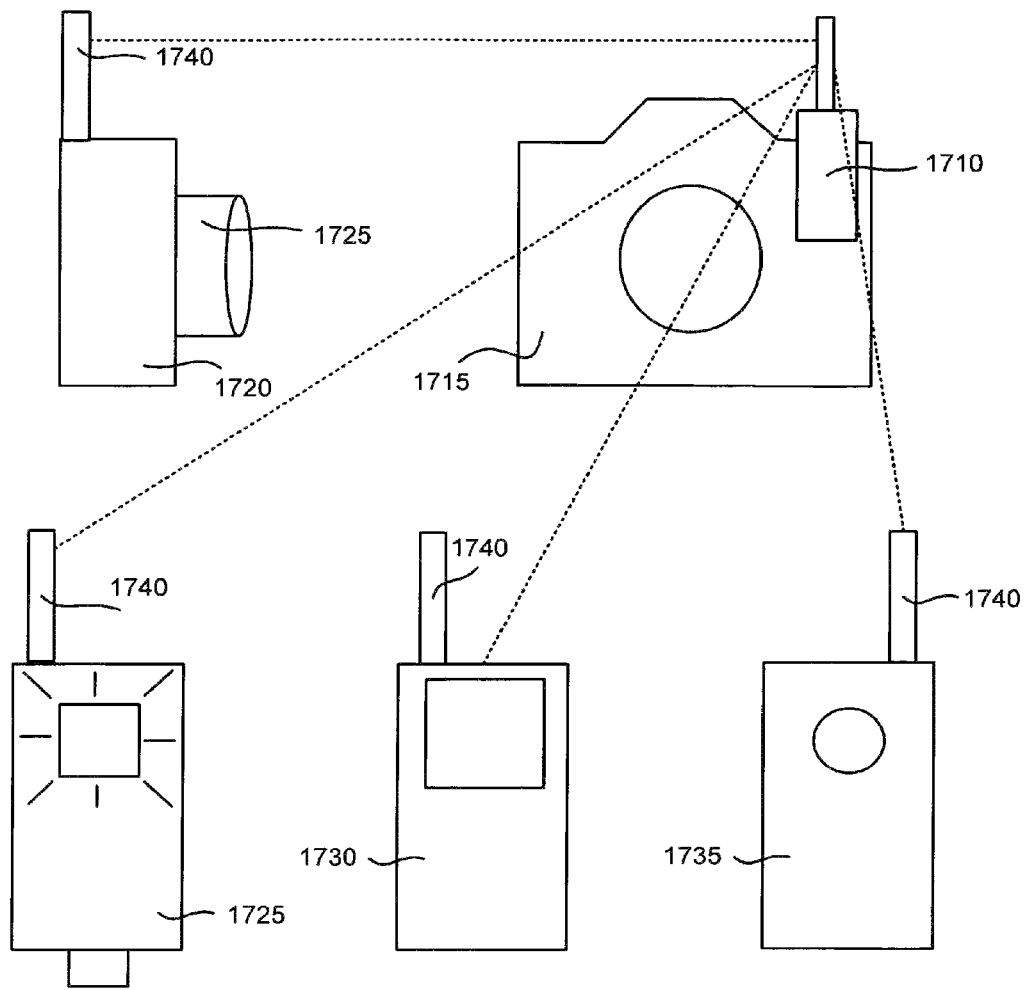
FIG. 17 illustrates a variety of exemplary wireless communication applications.

FIG. 17 illustrates various examples of wireless communication 1700 utilizing one embodiment of a wireless communication module 1710 that has been positioned with one or more pressure connectors (not shown) in direct communication with one or more external ports of a camera body 1715. It should be noted that although wireless communication module 1700 is shown from an external perspective that it may include internal circuitry (e.g., a transmitter, receiver, and supporting connecting circuitry) consistent with, and as will be apparent from, the current disclosure. Wireless communication module may provide camera body 1715 with wireless communication to and/or from one or more remote devices, such as a remote camera body 1720, a remote light source 1725, a remote general computing device 1730 (here, shown as a handheld general computing device), a remote light and/or color spectrum meter 1735, and any combinations thereof. Each of the one or more remote devices may include external and/or internal wireless communication capability 1740. Example wireless communication capability, such as wireless communication capability 1740, may include, but is not limited to, a wireless communication module according to the current disclosure, an internal wireless communication module positioned within the remote device (e.g., an internal wireless communication module as set forth in which is incorporated herein by reference in its entirety), an external wireless communication module connected via wire to the remote device, an external wireless communication module connected to a hotshoe of the remote device.

In one example, wireless communication module 1710 may receive from camera body 1715, and wirelessly communicate to remote camera 1720, an information from one or more external ports of camera body 1715. Camera body 1715 may utilize wireless communication module 1710 to communicate a variety of information to a remote camera, such as camera 1720. Example information for wireless communication to a remote camera includes, but is not limited to, a synchronization signal for synching an image acquisition parameter (e.g., shutter/light synchronization) of the remote camera, a trigger release signal, a control signal for controlling the remote camera, another image acquisition parameter (e.g., ISO, aperture, shutter speed, desired light exposure value, etc.), a confirmation signal (e.g., response to a previous communication, such as a synch signal, and any combinations thereof. In another example, wireless communication module 1710 may wirelessly receive from remote camera 1720, and communicate to camera body 1715, an information related to the operation of remote camera 1720. Example information for wireless communication from a remote camera includes, but is not limited to, a synchronization signal for synching an image acquisition parameter (e.g., shutter/light synchronization) of the remote camera, a trigger release signal, a control signal for controlling the remote camera, another image acquisition parameter (e.g., ISO, aperture, shutter speed, desired light exposure value, etc.), a confirmation signal (e.g., response to a previous communication, such as a synch signal, and any combinations thereof. Remote camera 1720 also includes a lens 1725 attached thereto.

In another example, wireless communication module 1710 may receive from camera body 1715, and wirelessly communicate to remote light source 1725, an information from one or more external ports of camera body 1715. Example information for wireless communication to a remote light source includes, but is not limited to a synchronization signal, a trigger signal, an image acquisition parameter, a desired light exposure value, a color temperature value, raw color spectrum information collected from a color spectrum detector, ISO, aperture, shutter speed, a control signal for operating a remote light source, a power adjustment, and any combinations thereof. Remote light source 1725 may include a flash light and/or a continuous light. In yet another example, wireless communication module 1710 may wirelessly receive from a remote light source, such as remote light source 1725, an information (e.g., a confirmation of light trigger) and communicate the information to camera body 1715.

In still another example, wireless communication module 1710 may receive from camera body 1715, and wirelessly communicate to remote general computing device 1730 (here shown as an exemplary handheld general computer device), information from one or more external ports of camera body 1715. Example information for wireless communication to a remote general computing device includes, but is not limited to, an image acquisition parameter, a color temperature value, an exposure value, and any combinations thereof. In still yet another example, wireless communication module 1710 may wirelessly receive from remote general computing device 1730, and communicate to camera body 1715, an information related to the operation of remote general computing device 1730.

In a further example, communication module 1710 may receive from camera body 1715, and wirelessly communicate to remote light and/or color spectrum meter 1735, information from one or more external ports of camera body 1715. Example information for wireless communication to a remote light and/or color spectrum meter includes, but is not limited to, an image acquisition parameter, a desired color temperature value, a desired exposure value, and any combinations thereof. In still yet another example, wireless communication module 1710 may wirelessly receive from remote light and/or color spectrum meter 1735, and communicate to camera body 1715, an information (e.g., a color temperature value, an exposure value, and any combination thereof) related to the operation of remote light and/or color spectrum meter 1735.

As discussed above in relation to various embodiments, a wireless communication module, such as wireless communication module 1710 may obtain information via one or more pressure connectors connected to the camera to which the module is attached for synchronizing a remote device with camera 1715. The information may be used to synchronize a remote device, such as a remote lighting device, a remote camera, or remote meter, to the shutter of the camera to which the module is attached. In one example, a wireless communication module, such as wireless communication module 1710 may receive a shutter synchronization information via a synchronization port (e.g., a PC connector) of a camera body to which the module is connected. In one example, the shutter synchronization information may be wirelessly communicated to a remote device (e.g., remote camera 1720, remote light source 1725, etc.) for synchronizing the remote device with image capture. In an alternate embodiment, a wireless communication module may use trigger information or voltage change information (e.g. a voltage change of a camera internal power source) from a camera port, such as a motor-drive port, and a known time between a trigger signal event and a shutter opening for a given camera (and/or camera setting) to synchronize the remote device via wireless communication. In such an embodiment, a memory may be utilized in the wireless communication device and/or at the remote device to store a known time between trigger signal and a shutter opening. In one example, a processor in a wireless communication module may utilize trigger information and voltage change information in conjunction with known timing information stored in a memory to determine an appropriate time to wirelessly transmit a synchronization signal to a remote device. In another example, a wireless communication module may wirelessly communicate received trigger information and voltage change information to a remote device, which may utilize stored timing information and a local processor to determine appropriate synchronization with the image acquisition. In another example, it may be necessary to factor time for the actual wireless transmission of information between a wireless communication module and a remote device.

Figure 18:
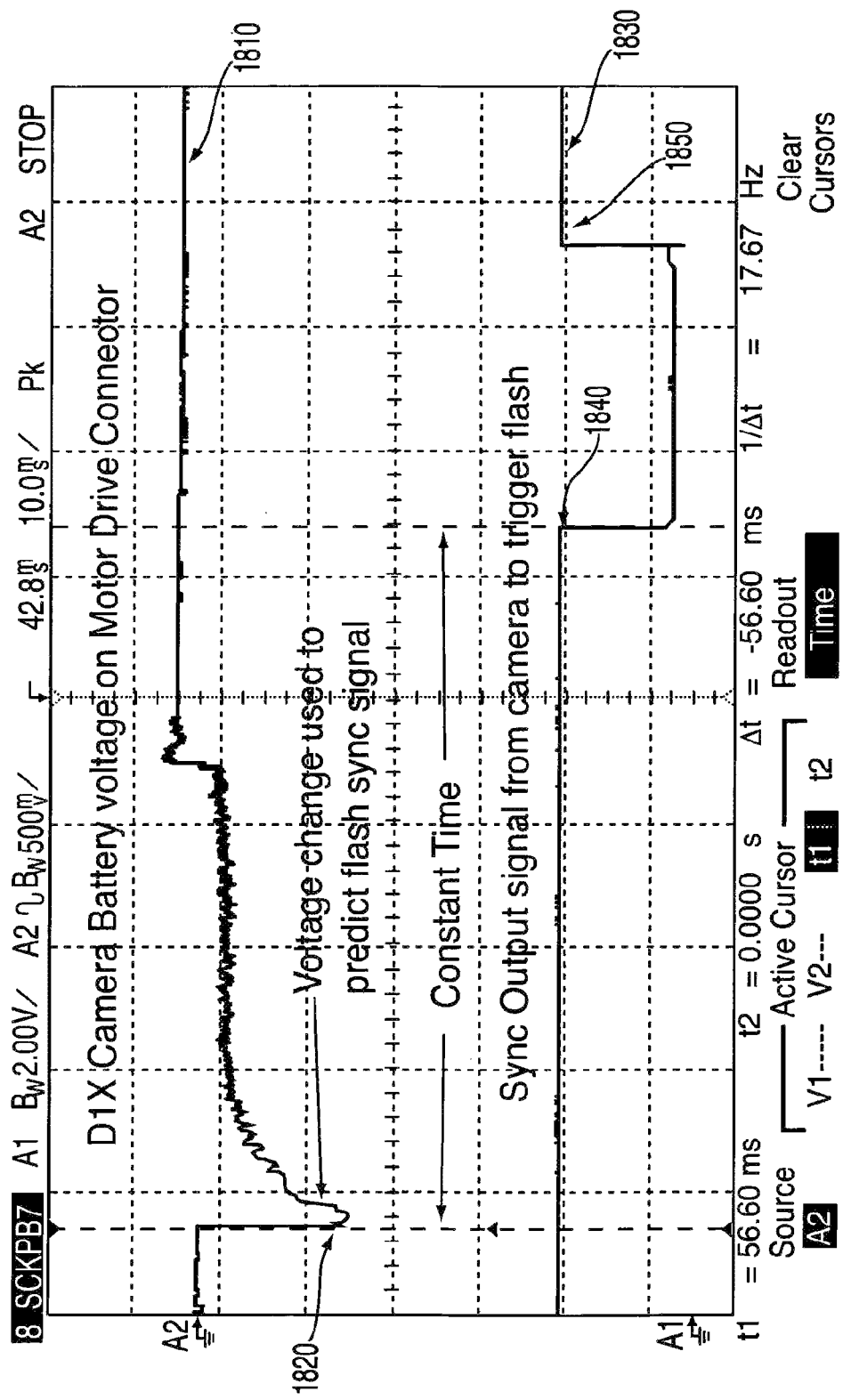
FIG. 18 illustrates an example voltage plot.

In another alternative embodiment, a wireless communication module may monitor the voltage of an internal camera power supply to which it is connected via one or more pressure connector. Inclusion of monitoring circuitry as part of processing circuitry in a wireless communication module allows monitoring for changes indicative of certain internal events in the camera body. FIG. 18 shows an example plot 1810 of voltage accessed through an example port of a camera (in this case a motor-drive port of a Nikon D1X camera) versus time. At point 1820 a steep change in voltage indicates a trigger event within the camera body. Plot 1830 is of a shutter synchronization output signal for the same camera. Plot 1830 at point 1840 indicates shutter opening and at point 1850 shutter closing. The time between point 1820 and 1840 can be determined and used reliably to predict the opening of a shutter based on a trigger event. This method of synchronization may be used where a wireless communication module does not have access to a conventional shutter synchronization signal from within the camera body. One example of this may be when a wireless communication module has a single pressure connector that connects to a port without shutter synchronization signal, but has access to power. One benefit to such a technique for detecting shutter synchronization includes a cost reduction of eliminating an extra connector port on a wireless communication module for synchronization, even where a camera body includes a port having access to a synchronization signal.

In another example, a voltage output change from a camera body may be uniquely related to internal activity of a camera body. Internal activity, such as the start of a mirror opening, the stop of a mirror opening, first shutter movement, and/or subsequent shutter movement may cause signature voltage spikes that may be reliably used to predict a shutter opening. Thus, the predicted shutter opening could be used to synchronize a remote device via wireless communication using a wireless communication module, such as wireless communication module 1710. Voltage activity from the internal power supply may be compared by proper circuitry within a wireless communication module to one or more stored voltage signatures (possibly in a memory of the wireless communication module) to determine an internal event indicative of a shutter opening.

In another example, a voltage output change from the camera body may be used to gain extra time prior to the shutter opening for sending redundant signals that contain time stamps as to when the shutter will be open in the very near future. This extra time can enable a zero delay remote shutter synchronization. For example, if a specific voltage event indicates that the shutter will be open in exactly 28 milliseconds, the wireless communication module may send a signal to the remote flash device to activate in 28 milliseconds less the amount of time it took for wireless communications to complete. This zero delay system is unique and is not used by any current wireless system.

In a further example, a wireless communication module may include an audio reception device, (e.g., a microphone), to receive audio signals from within a camera body. A camera body may produce signature audio waves that are a function of particular events that occur within the camera body. For example, a mirror slapping open (or other internal event) may produce unique audio of a predictable wavelength and/or amplitude that can be monitored by an audio reception device of a wireless communication module. The measured audio may be compared to one or more stored audio signatures (possibly in a memory of the wireless communication module) to determine an internal event indicative of a shutter opening. Because of the time required for audio to travel from a camera body to an audio reception device, it may be important to maintain a fixed known distance between the camera body and the audio reception device.

Figure 19:
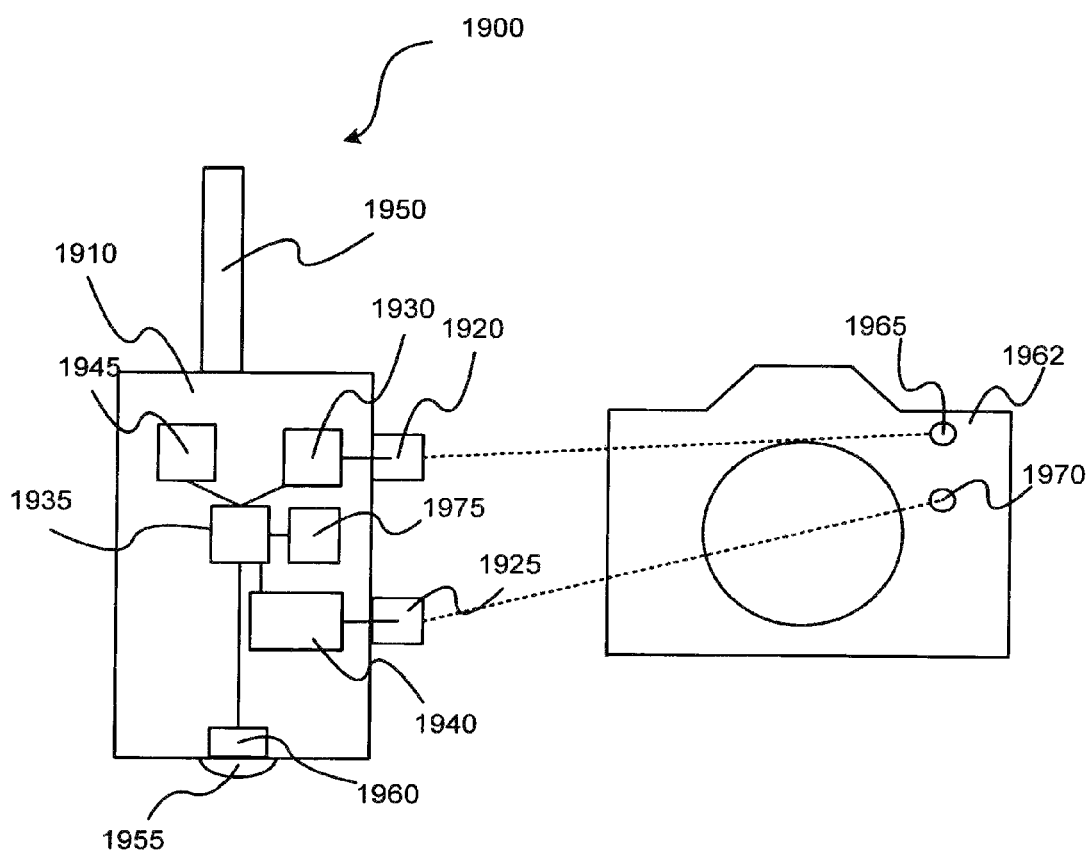
FIG. 19 illustrates one example of a wireless communication module having an example of an audio reception device.

FIG. 19 illustrates still yet another embodiment of a wireless communication module 1900 having a module body 1910. Wireless communication module 1900 includes a first pressure connector 1920 and a second pressure connector 1925. First pressure connector 1920 is in communication with a synchronization module 1930, which in turn is in communication with a processor 1935. Second pressure connector 1925 is in communication with a power management module 1940, which in turn is in communication with processor 1935. Processor 1935 is in communication with a transmitter 1945 and an antenna 1950 for wirelessly communicating with a remote device. Wireless communication module 1900 also includes an audio reception device 1955 (e.g., a microphone), which is in communication with audio circuitry 1960 connected to processor 1935 for providing audio information detected by audio reception device 1955 to processor 1935. When processor 1935 receives audio information, it may compare that information to known audio values for a camera 1962 to which wireless communication module 1900 may be attached via one or more of first and second pressure connectors 1920, 1930 and one or more external ports 1965, 1970 of camera 1960. Known audio values may be stored in, and accessed from, a memory 1975 in communication with processor 1935.

Figure 20:
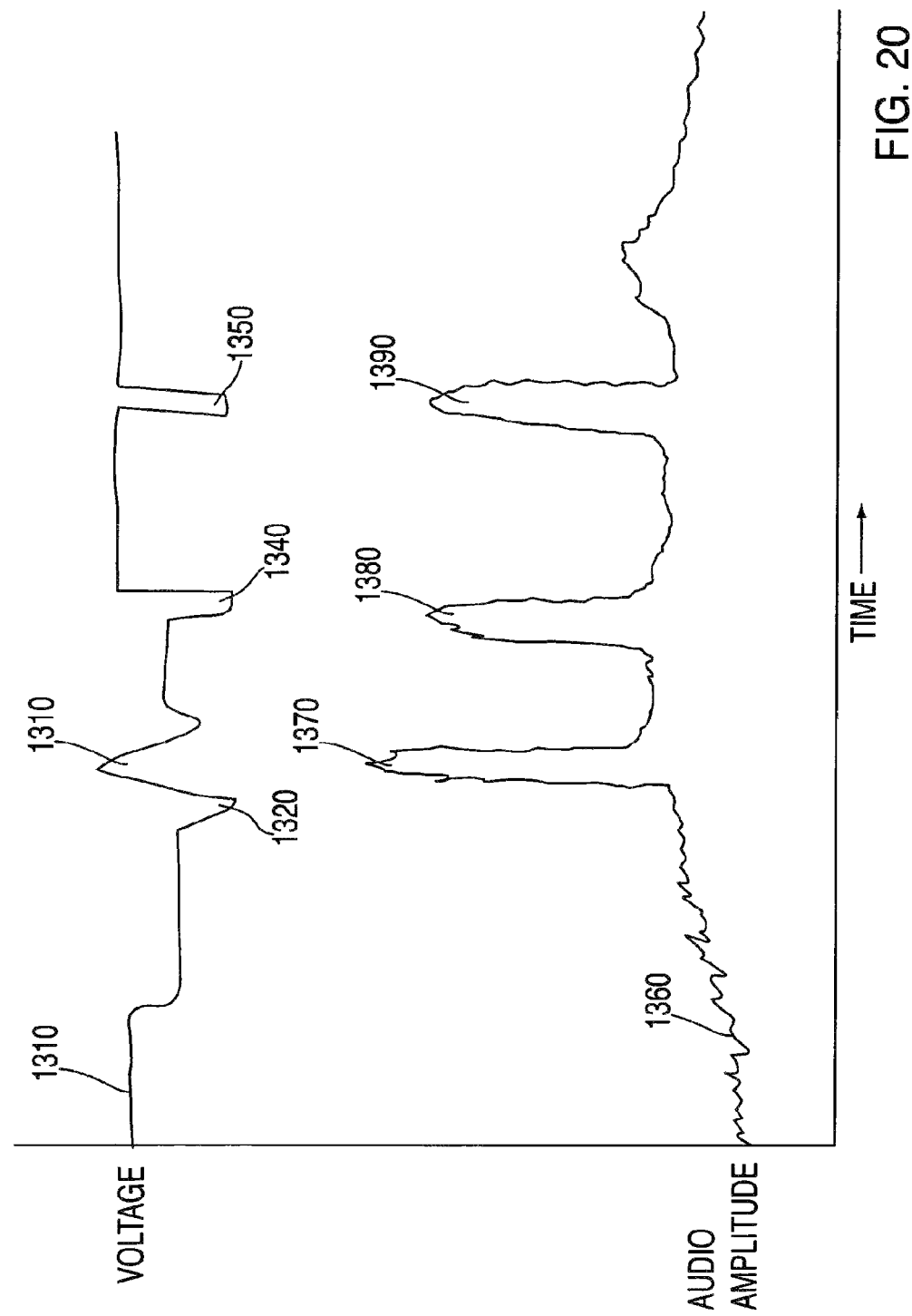
FIG. 20 illustrates an example of a voltage plot and an example of an audio amplitude plot.

As discussed above, known times between certain internal events and shutter activity may be used in conjunction with voltage and audio activity to predict shutter activity timing. FIG. 20 illustrates a hypothetical plot 2010 of a voltage signature over time for a power supply of an exemplary camera. Plot 2010 includes various peaks indicative of internal activity. For example, peak 2020 may represent a mirror starting to open, peak 2030 may represent a mirror stopping, peak 2040 may represent a first shutter movement, and peak 2050 may represent a second shutter movement. Plot 2060 represents a hypothetical audio signature over time for the same camera. Plot 2060 includes various peaks indicative of internal activity. For example, peak 2070 may represent the mirror stopping movement, peak 2080 may represent a first shutter activity, and peak 2090 may represent a second shutter activity.

A wireless communication module according to the various embodiments discussed herein may include a memory in order to facilitate the storage of information, such as information related to known times between trigger and shutter activity, voltage signatures for one or more cameras, signal encryption, channel settings, processing instructions, and any combinations thereof.

Figure 21:
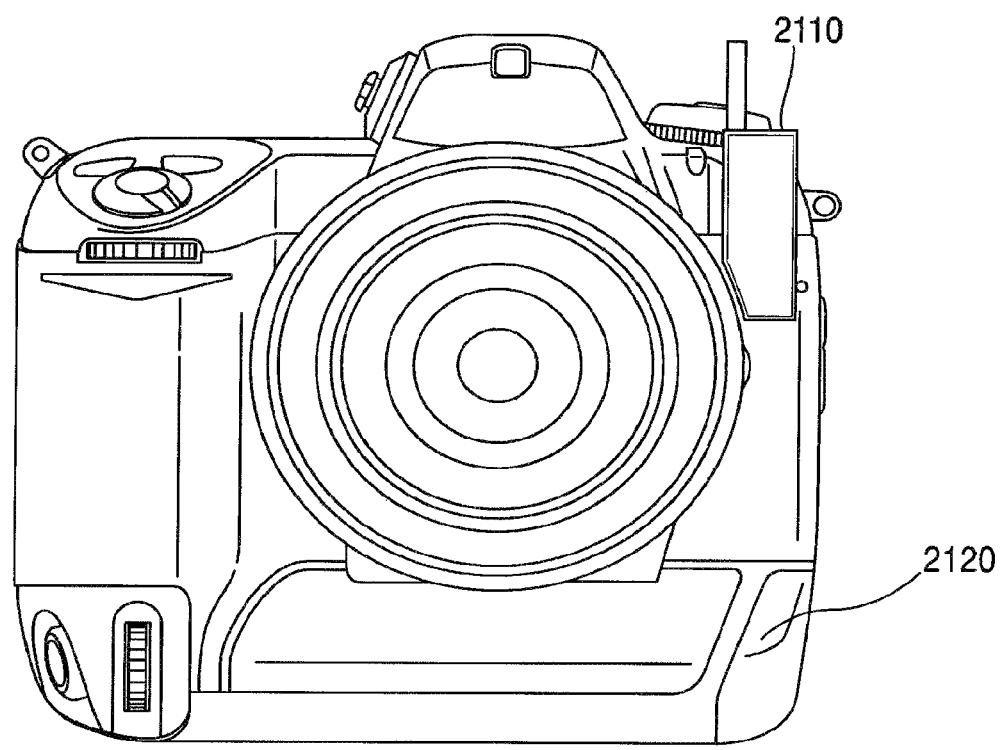
FIG. 21 illustrates yet another example of a wireless communication module directly connected to an example camera body.

FIG. 21 illustrates a further embodiment of a wireless communication module 2110 directly connected to a camera body 2120. It should be noted that although wireless communication module 2110 is shown from an external perspective that it may include internal circuitry (e.g., a transmitter, receiver, and supporting connecting circuitry) consistent with, and as will be apparent from, the current disclosure. Wireless communication module 2110 is shown in direct connection with a PC port and a motor-drive port (both not shown in this view) of camera 2120 via a first and second pressure connectors of wireless communication module 2110. A wireless communication module according to the various embodiments discussed herein, such as wireless communication module 2110 may come into direct communication with external ports of camera, such as camera 2110, in a variety of ways that will be apparent from the current disclosure to one of ordinary skill. In one example, a wireless communication module, such as module 2110, may include one or more pressure connectors that provide direct physical connection of the wireless communication module with a camera at one or more external ports of the camera body. In another example, a wireless communication module, such as module 2110, may include one or more pressure connectors. A first pressure connector may be directly connected to one external port of a camera body and a second pressure connector may be directly connected to a second external port of a camera body. Additional ports and connectors may optionally be utilized. In yet another example, a wireless communication module, such as module 2110, may be removably directly connected to one or more external ports of a camera body, such as camera 2120, via one or more pressure connectors. In still another example, a wireless communication module, such as module 2110, may include two or more pressure connectors. A body of the wireless communication module may be moved toward a two or more external ports of a camera body and simultaneously engaging the two or more pressure connectors of the wireless communication module with the two or more external ports providing communication between a transmitter of the wireless communication module and the external ports.

Information and/or power may be provided to a wireless communication module and/or information may be provided to a camera from a wireless communication module according to any of the above discussed examples. Wireless communication module 2110 also illustrates an example shape and configuration that does not interfere with utilization of external camera controls, including the ability to change a lens without removing wireless communication module 2110.

Figures 22A, 22B:
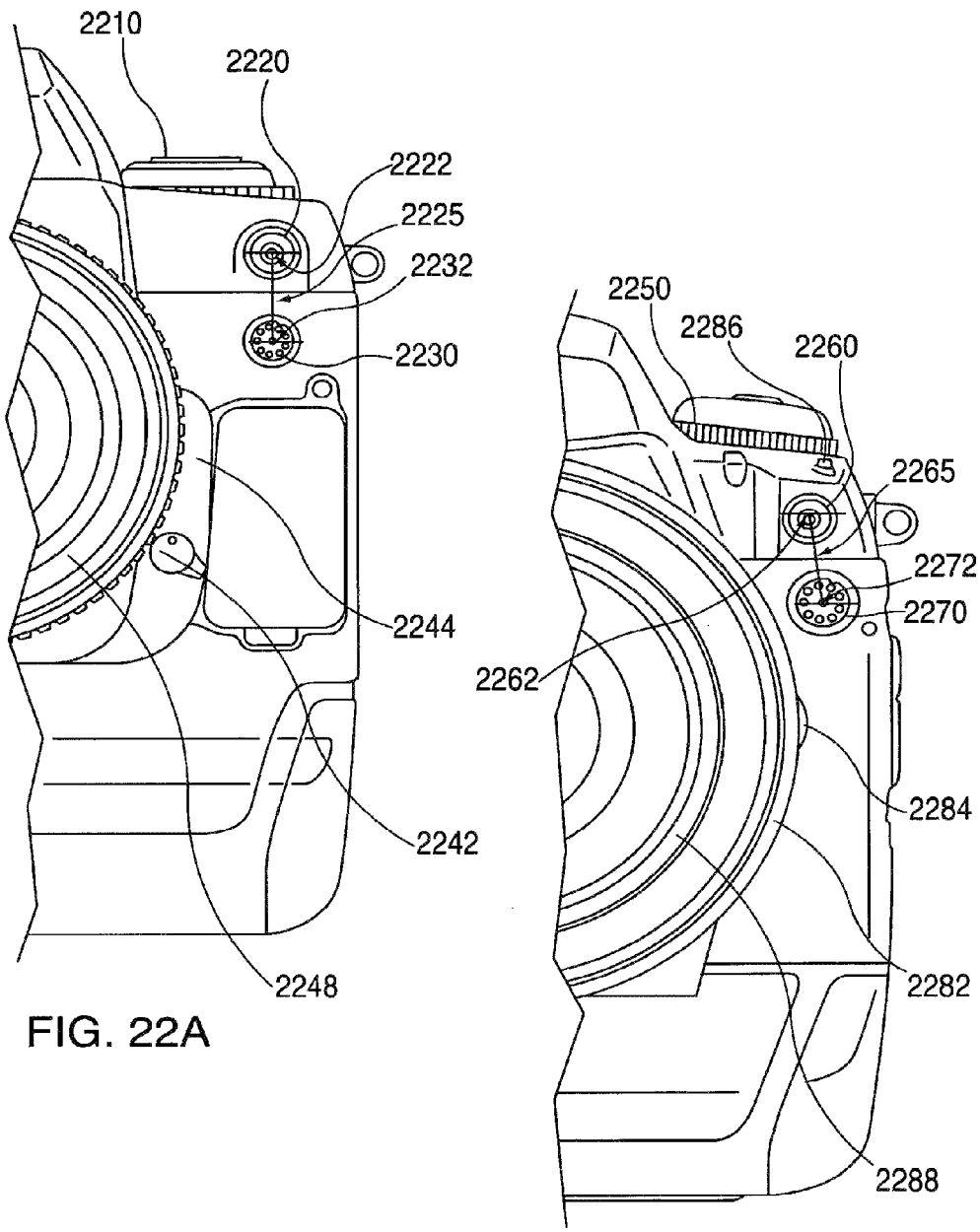
FIG. 22A illustrates one example of exemplary external port configuration.
FIG. 22B illustrates another example of exemplary external port configuration.

FIG. 22 illustrates two examples of ports on two different camera bodies. Camera body 2210 includes a first port 2220 and a second port 2230, each having a center axis 2222 and 2232, respectively. Camera body 2250 includes a first port 2260 and a second port 2270, each having a center axis 2262 and 2272 respectively. First and second ports 2220 and 2230 are positioned at a different distance from each other and configured at different angles from each other than first and second ports 2260 and 2270. First port 2220 and second port 2230 each have a center axis 2222 and 2232 that are spaced a first distance 2225 from each other. First port 2260 and second port 2270 each have a center axis 2262 and 2272 that are spaced a second distance 2265 from each other. In this example, first distance 2225 is about 22 millimeters (mm). Thus, a corresponding example wireless communication module may have first and second pressure connectors with center axes that are about 22 mm apart. In this example, second distance 2265 is about 22.5 mm. Thus, a corresponding example wireless communication module may have first and second pressure connectors with center axes that are about 22.5 mm apart. In one example, a distance between a first and second pressure connectors of a wireless communication module may be variable in distance and configuration (e.g. angle, rotation, etc.) to allow connectivity with a variety of camera bodies. In another example, first and second pressure connectors of a wireless communication module each have a center axis and the center axis of the first pressure connector is spaced a distance from the center axis of the second pressure connector where that distance is a distance from about 20 mm to about 24 mm. A module body may be of any of a variety of sizes and shapes with a variety of configurations and distances between depression connectors, the above values are only indicative of select examples. Camera bodies 2210 and 2250 indicate that a single example wireless communication module with moveable depression connectors may be utilized to connect to two or more different camera bodies (e.g., see wireless communication modules 900 and 1000 of FIG. 9 and FIG. 10, respectively.

FIG. 22 also illustrates the limited space on some camera bodies for a wireless communication module to connect to ports on a camera body without obstructing external camera controls, including not restricting the ability to remove and/or change lens 2248. Camera body 2210 includes external camera controls 2242 and 2244. Camera body 2210 also includes lens 2248. Some camera bodies may also have a flash mounted above the lens. Camera body 2260 includes external camera controls 2282, 2284, and 2286; and lens 2288. As discussed above, a module body and/or antenna may be of any shape, size, and/or configuration to suit a particular camera body.

In another embodiment, a method of modifying a camera to allow the camera to wirelessly communicate with a remote device is provided. A wireless communication module having one or more pressure connectors according to the various embodiments discussed herein may be connected to one or more ports of the camera.

In yet another embodiment, a method of communicating between a camera and a remote device is provided. A wireless communication module having one or more pressure connectors according to the various embodiments discussed herein may be connected to one or more ports of the camera. The wireless communication module may utilize a transmitter, receiver, and/or transceiver within the module body and connections made between the one or more pressure connectors and the one or more ports to communicate information to or from the remote device. Communication of information may include controlling the remote device and/or controlling the camera from the remote device.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of synchronizing a remote lighting device to image acquisition by a camera body, the method comprising:
    detecting a predictor signal of the camera body, the predictor signal occurring at a known time prior to a shutter of the camera body opening;
    wirelessly communicating one or more signals to the remote lighting device, at least one of the one or more signals including a time indication based on the time between the predictor signal and the shutter opening; and
    synchronizing the remote lighting device to image acquisition using the time indication.

2. A method according to claim 1, wherein the predictor signal is a change in an internal power supply of the camera body.

3. A method according to claim 1, wherein the predictor signal is related to an internal activity of the camera body.

4. A method according to claim 1, further comprising using a predictive information stored in a memory to determine the time indication, the predictive information including information related to the time between the predictor signal and the shutter opening.

5. A method according to claim 1, wherein the time indication is based on the time required for wireless communication and the time between the predictor signal and the shutter opening.

6. A method according to claim 1, further comprising receiving a remote signal from a light meter positioned remotely from the camera body and communicating the remote signal to the camera body.

7. A method according to claim 1, wherein said synchronizing includes activating the remote lighting device at a time that the shutter of the camera body is open.

8. A method according to claim 1, wherein said synchronizing includes activating the remote lighting device at a time that a synchronization output signal is generated by the camera body.

9. A method according to claim 1, wherein said wirelessly communicating is performed using a wireless communication module external to the camera body.

10. A method according to claim 9, wherein the wireless communication module does not have access to a conventional synchronization signal of the camera body.

11. A method according to claim 9, wherein the wireless communication module includes:
    a module body;
    a wireless communication circuit;
    a first connector in communication with said wireless communication circuit, said first connector for connecting said module body to a port of the camera for detecting the predictor signal; and
    an antenna in communication with said wireless communication circuit for wirelessly communicating with the remote lighting device.

12. A method of synchronizing a remote lighting device to image acquisition by a camera body, the method comprising:
    detecting a predictor signal of the camera body, the predictor signal occurring a known time prior to a shutter of the camera body opening;
    wirelessly communicating one or more signals to the remote lighting device, at least one of the one or more signals including information based on the detected predictor signal; and
    using stored predictive information of the time between the detected predictor signal and the shutter opening to synchronize the remote lighting device to image acquisition.

13. A method according to claim 12, wherein the information based on the detected predictor signal is used after said wirelessly communicating, the information based on the detected predictor signal being used with the stored predictive information to determine the time of synchronization of the remote lighting device.

14. A method according to claim 12, wherein the information based on the detected predictor signal includes a time of synchronization of the remote lighting device determined using the stored predictive information prior to said wirelessly communicating.

15. A method according to claim 12, further comprising receiving a remote signal from a light meter positioned remotely from the camera body and communicating the remote signal to the camera body.

16. A method according to claim 12, wherein the remote lighting device is synchronized to activate at the time that the shutter of the camera body is open.

17. A method according to claim 12, wherein the remote lighting device is synchronized to activate at the time that a synchronization output signal is generated by the camera body.

18. A wireless communication system for synchronizing a remote lighting device to image acquisition by a camera body, the wireless communication system including:
- a connection to an external connector of the camera body, the external connector providing access to a predictor signal of the camera body occurring at a known time prior to a shutter opening of the camera body;
- a wireless communication circuit for wirelessly communicating one or more signals to the remote lighting device, the one or more signals being based on a detected predictor signal from the external connector;
- a memory element having stored timing information, the stored timing information including predictive information indicating a time between the detected predictor signal and the shutter opening; and
- a processor for determining a time of synchronization of the remote lighting device from the detected predictor signal and the stored timing information.

19. A system according to claim 18, wherein the processor is located at the remote lighting device and the one or more signals includes an indication of the time of the detected predictor signal.

20. A system according to claim 18, wherein the processor is located at the camera body and the one or more signals includes a time indication based on the time between the detected predictor signal and the shutter opening.

* * * * *